United States Patent
Zhong et al.

(10) Patent No.: US 11,763,684 B2
(45) Date of Patent: Sep. 19, 2023

(54) SYSTEMS AND METHODS FOR VEHICLE OPERATOR AND DISPATCHER INTERFACING

(71) Applicant: Honeywell International Inc., Charlotte, NC (US)

(72) Inventors: Yi Zhong, Beijing (CN); Raghu Shamasundar, Bangalore (IN); Dan Li, Shanghai (CN); Ramkumar Rajendran, Madurai (IN); Kalimulla Khan, Bangalore (IN); Visakh Sivadasan, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 140 days.

(21) Appl. No.: 17/181,149

(22) Filed: Feb. 22, 2021

(65) Prior Publication Data
US 2022/0130261 A1  Apr. 28, 2022

(30) Foreign Application Priority Data

Oct. 28, 2020  (IN) .............................. 202011047092

(51) Int. Cl.
*G08G 5/00* (2006.01)
*G07C 5/00* (2006.01)
(Continued)

(52) U.S. Cl.
CPC .......... *G08G 5/0021* (2013.01); *B64D 43/00* (2013.01); *B64F 5/60* (2017.01); *G07C 5/008* (2013.01);
(Continued)

(58) Field of Classification Search
CPC .. G08G 5/0021; G08G 5/0026; G08G 5/0039; G08G 5/0013; G08G 5/0052;
(Continued)

(56) References Cited

U.S. PATENT DOCUMENTS 6,873,903 B2   3/2005  Baiada et al.
7,151,995 B2  12/2006  Jasselin
(Continued)

*Primary Examiner* — Shon G Foley
(74) *Attorney, Agent, or Firm* — Bookoff McAndrews, PLLC

(57) ABSTRACT

A joint-decision making system for a vehicle operator and a dispatcher is disclosed, comprising: a vehicle operator engine implemented on a vehicle system configured to: detect a trigger event condition; retrieve vehicle information relevant to the event trigger condition; receive additional information relevant to the event trigger condition; generate a suggested response based on the trigger event condition, retrieved vehicle information, and received additional information; display the suggested response on a graphical user interface of the vehicle operator engine; and transmit the trigger event condition, vehicle information, and suggested response to a dispatcher engine; and the dispatcher engine implemented on a ground system configured to: receive the event trigger condition, vehicle information, and suggested response from the vehicle operator engine; retrieve the additional information relevant to the event trigger condition; and display the suggested response on a graphical user interface of the dispatcher engine.

20 Claims, 16 Drawing Sheets

(51) Int. Cl.
*B64F 5/60* (2017.01)
*B64D 43/00* (2006.01)

(52) U.S. Cl.
CPC ......... *G08G 5/0026* (2013.01); *G08G 5/0039* (2013.01)

(58) Field of Classification Search
CPC .... G08G 5/0056; G08G 5/006; G08G 5/0091; B64D 43/00; B64F 5/60; G07C 5/008
See application file for complete search history.

(56) References Cited

U.S. PATENT DOCUMENTS

| | | |
|---|---|---|
| 7,366,591 B2 | 4/2008 | Hartmann et al. |
| 8,032,267 B1 | 10/2011 | Simon |
| 8,378,853 B2 | 2/2013 | Smith et al. |
| 8,565,944 B1 | 10/2013 | Gershzohn |
| 2006/0144997 A1* | 7/2006 | Schmidt ............... G07C 5/0808 340/960 |
| 2014/0018979 A1 | 1/2014 | Goossen et al. |
| 2014/0343765 A1 | 11/2014 | Suiter et al. |
| 2016/0316481 A1 | 10/2016 | Barailler et al. |
| 2017/0221367 A1 | 8/2017 | Kawalkar et al. |
| 2020/0273350 A1 | 8/2020 | Litvova et al. |

\* cited by examiner

SYSTEMS AND METHODS FOR VEHICLE OPERATOR AND DISPATCHER INTERFACING

CROSS-REFERENCE TO RELATED APPLICATIONS

This application claims the benefit of priority under 35 U.S.C. § 119 from Indian Patent Application No. 202011047092, filed on Oct. 28, 2020, the contents of which are incorporated by reference in its entirety.

TECHNICAL FIELD

Various embodiments of the present disclosure relate generally to the field of vehicle and dispatcher information sharing systems and, more particularly, to an interface for facilitating communication and sharing information between an aircraft traffic control dispatcher and a pilot.

BACKGROUND

During non-routine flight operations (e.g., equipment failure, weather disruption, destination airport congestion, temporary flight restrictions, etc.), pilots and air traffic control dispatchers typically work together to determine the appropriate course of action in order to continue the flight safely. During these event conditions, the level of situational awareness between a pilot and a dispatcher may vary depending on the information available at his or her disposal. While a pilot typically might have a better understanding of aircraft specific information such as aircraft performance and data from weather radar and the onboard flight management system, the dispatcher might have better access to the latest weather forecasts and traffic congestion or other conditions at the destination airports, or other information that may be less accessible to the pilot onboard the aircraft. Currently, information is relayed between a dispatcher and pilot via a datalink transmission (for example, a digital data transmission through Aircraft Communications Addressing and Reporting System (ACARS) over high frequency, very high frequency, or satellite communication mediums) or voice communication for joint decision making. Because a dispatcher is typically following multiple flights simultaneously, the decision-making process can be further time consuming as well as sub-optimal due to inadequate real-time information accessible to the dispatcher and/or pilot. Following is the time typically taken by the dispatchers for some of the key activities during the flight:

ETOPS Evaluation—35 minutes;
Weather Disruption Handling—30 minutes; and
Redispatch Evaluation—32 minutes.

In response to certain non-routine flight operations, for example, emergency event conditions on the aircraft such as, but not limited to, engine out, cabin depressurization, power loss, other equipment failure, maintenance fault, or an efficiency opportunity, the dispatcher typically assists the onboard crew by providing an alternate airport diversion. The alternate airport diversion is different than the planned route, and is typically required when there is a major failure in the system. However, during such emergency conditions, it may not be optimal for the onboard crew and dispatcher to simply identify the alternate airport based solely on distance, as this does not account for cockpit data such as fuel flow, remaining fuel, current cruise altitude, one or more configurable airline policies, or other extra-aircraft parameters that impact the ability of an aircraft to reach the alternate airport diversion. In some cases, the pilot may contact the dispatcher, typically by voice communication, to share information and negotiate with the dispatcher to jointly determine the best alternate airport diversion based on the shared information. However, these negotiations and discussions lead to additional time delay, which may result in negative or undesirable outcomes during emergency conditions.

Some onboard systems, such as flight management systems, may provide navigation, guidance and flight planning functions which enable the flight crew to view the current flight path along with the associated flight time and fuel information. During emergency conditions, an alternate airport may be populated based on shortest distance from the aircraft and provided to the crew. However, these alternates are not based on airline or aircraft requirements, and further, they also require negotiation with a dispatcher to determine the optimal alternate airport diversions.

Currently, there is no common utility or technical system which gathers information from the aircraft, for example, aircraft state, fuel or other critical information, and provides the required advisory simultaneously for both crew and dispatcher with sufficient accuracy to assist the dispatcher and crew in determining optimal alternate airport diversions.

Further, flight dispatchers during airline operations may often be tracking several aircrafts simultaneously, and are responsible for maintaining a complete view of aircraft situational awareness including traffic and weather conditions, flight restrictions, destination airport conditions, pilot reports, notice to airmen, and so forth. Dispatchers typically monitor flight conditions through destinations to identify any anomalies that may have an impact on the safety of the flight, and accordingly may suggest appropriate actions to aircraft crews to avert the situation.

Although dispatchers have access to large sets of information, including radar information, weather forecasts, ACARS reports, etc., due to time constraints, they are often limited to near term decision making and in most cases are acting reactively based on events that have already occurred (e.g., engine out, violation of standard operating procedure, changed weather conditions in the vicinity of the aircraft, etc.). In such time-constrained scenarios, there is a significant workload increase for the crew and dispatcher, and decisions are made based on rule-of-thumb, which in many cases result in efficiencies or sub-optimal outcomes. There is no mechanism or technology for automatically anticipating events or anomalies during flight ahead of time, such that dispatchers and pilots can make informed decisions for averting anomalies before they occur.

The present disclosure is directed to overcoming one or more of the above-referenced challenges.

SUMMARY OF THE DISCLOSURE

According to certain aspects of the disclosure, a system is disclosed for joint-decision making, comprising: a vehicle operator engine implemented on a vehicle system comprising one or more processors configured to: detect a trigger event condition; retrieve vehicle information relevant to the event trigger condition from one or more local servers; receive additional information relevant to the event trigger condition over a network from one or more remote servers; generate a suggested response based on the trigger event condition, retrieved vehicle information, and received additional information; display the suggested response on a graphical user interface of the vehicle operator engine; and transmit, over a network, the trigger event condition, vehicle information, and suggested response to a dispatcher engine; and the dispatcher engine implemented on a ground system comprising one or more processors configured to: receive the event trigger condition, vehicle information, and suggested response from the vehicle operator engine; retrieve the additional information relevant to the event trigger condition over the network from the one or more remote servers; and display the suggested response on a graphical user interface of the dispatcher engine.

According to another aspect of the disclosures, a computer-implemented method for joint-decision making between a vehicle and a dispatcher, the method comprising: detecting, by one or more processors, a trigger event condition; retrieving, by the one or more processors, vehicle information relevant to the event trigger condition from one or more local servers; receiving, by the one or more processors, additional information relevant to the event trigger condition from one or more remote servers; generating, by the one or more processors, a suggested response based on the trigger event condition, retrieved vehicle information, and received additional information; displaying, by the one or more processors, the suggested response on a graphical user interface of a vehicle operator engine; and transmitting, over a network by the one or more processors, one or more of the trigger event condition, retrieved vehicle information, or suggested response to a dispatcher engine.

According to yet another aspect of the disclosure, non-transitory computer readable medium storing instructions which, when executed by at least one processor, cause the at least one processor to perform operations for joint decision making between a vehicle and a dispatcher, the operations comprising: detecting, by a vehicle operator engine, a trigger event condition; retrieving, by the vehicle operator engine, vehicle information relevant to the event trigger condition from one or more local servers; receiving, by the vehicle operator engine, additional information relevant to the event trigger condition from one or more remote servers; generating, by the vehicle operator engine, a suggested response based on the trigger event condition, retrieved vehicle information, and received additional information; displaying, by the vehicle operator engine, the suggested response on a graphical user interface of the vehicle operator engine; and transmitting, by the vehicle operator engine, one or more of the trigger event condition, retrieved vehicle information, or suggested response to a dispatcher engine.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
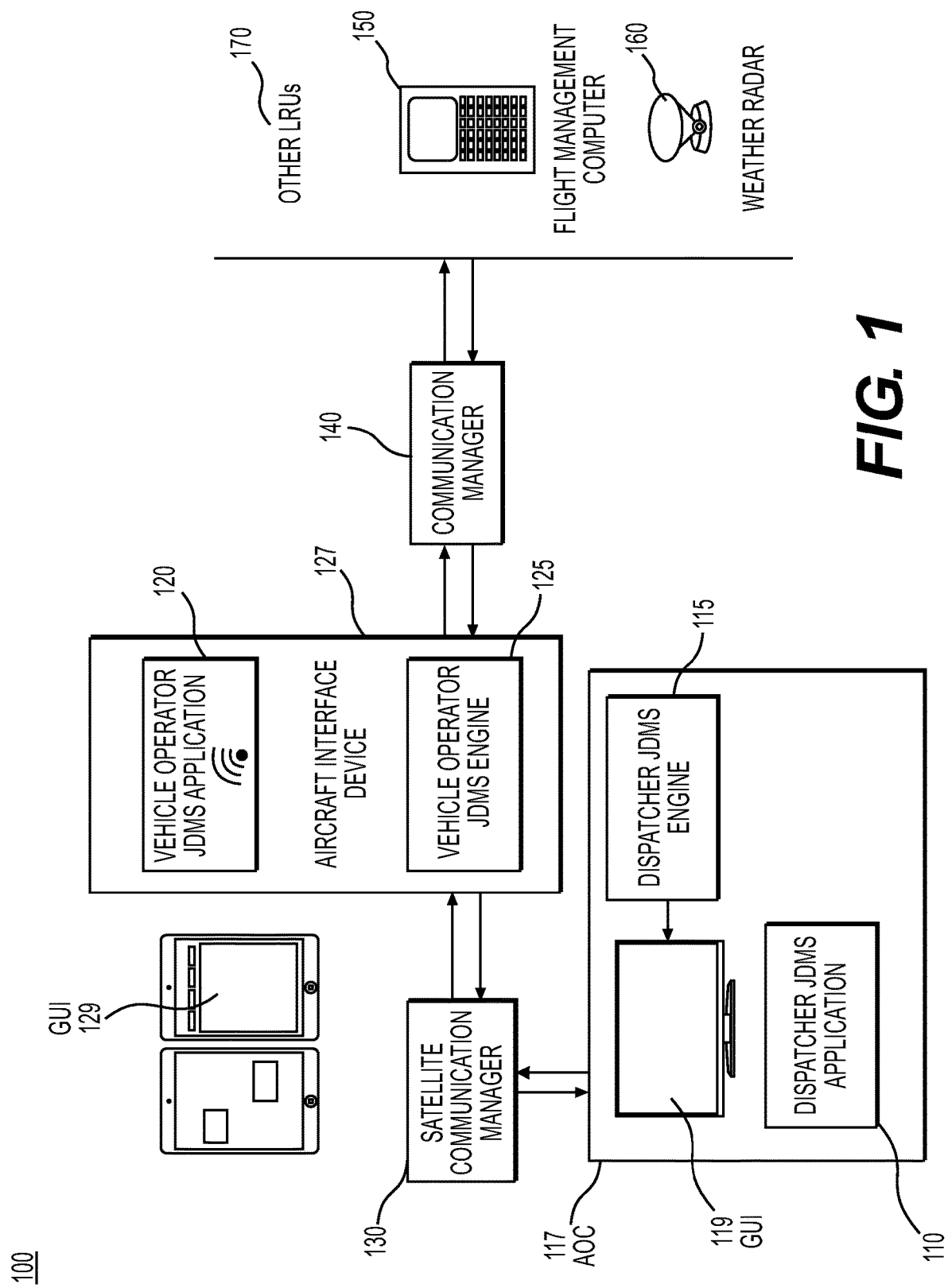
FIG. 1 depicts an exemplary environment in which systems, methods and other aspects of the present disclosure may be implemented.

Various embodiments of the present disclosure relate generally to a joint-decision-making system for communications between a vehicle operator and a dispatcher.

As discussed above, there is a need for a common utility system which gathers information from the aircraft, specifically aircraft state, fuel and other critical information, and provides required advisory for both crew and dispatcher at the same time with accurate, most current information, which may help the dispatcher and crew to decide the best course of action during events or conditions that occur during operation of the aircraft.

A proposed technical solution for the aforementioned problems is a Joint Decision-Making System (JDMS) that augments all the data sources and provides a consistent visualization to both the pilot and the dispatcher. Based on an event trigger condition (which in some embodiments may be automatically detected), information is simultaneously and automatically exchanged between the aircraft and ground (dispatcher) via a medium such as, but not limited to, ACARS or SATCOM (in some embodiments, automatically in the background without a need for pilot or dispatcher action), ensuring that both the on-board and ground applications work from the same data sources, including sources both onboard the aircraft and external to the aircraft. An exemplary technical solution to the aforementioned problems presented herein includes a dispatcher-crew shared graphical visualization of aircraft state, planned profile, forecast weather or traffic data, and other relevant information. Graphical user interfaces (GUIs) for a vehicle operator or pilot engine and a dispatcher engine further incorporate a chat window for negotiation or data exchange between crew, dispatcher and a Tail-specific performance data computer. In some embodiments, the proposed solution further includes a dispatcher event prediction system that evaluates the Aircraft 4D trajectory data for standard operating procedures violations, weather/traffic disruptions and route speed and cruise altitude restrictions. The system provides a model to induce real-time restrictions like traffic congestions and holds at destination, and computes the potential impact against the safety of the flight. This system may provide recommendations to mitigate the event based on standard procedures, and may also provide alternate airport diversions visible to both the dispatcher and the pilot on the GUIs of their respective engines. In some embodiments, a machine learning engine may be implemented for generating predictions. For example, a managed machine may be trained to automatically detect potential operation procedures based on a training data set comprising prior flight data, and determining a likelihood of a future violation of a standard operating procedure based on whether a predetermined threshold is met.

Embodiments of the present disclosure provide solutions to integrate the aircraft data to common utility functions which are capable of providing the real time advisory for closest airport selection. In some embodiments, the disclosed system determines the required alternate airport diversion based on the configurable airline policy and cockpit data to derive a smart diversion plan during the emergency or abnormal condition.

In some embodiments, a common mission manager engine is used to supplement both onboard and off-board (e.g., dispatcher or other ground) systems so that each system will provide the same information to display on their respective graphical user interfaces (GUIs). Based on this display of common real time information, a vehicle operator and dispatcher may quickly come to a common understanding of the data and take necessary actions in a prompt manner during emergency execution. In some embodiments, the mission manager engine uses the aircraft performance data to compute the fuel consumption considering the regulatory fuel policy (e.g., trip fuel, alternate fuel, contingency fuel, etc.). In this disclosure, the terms "vehicle operator," "pilot," and "crew" are used interchangeably. Also, the terms "dispatcher" and "ground operator" are used interchangeably.

In some embodiments, the system associated with the mission manager engine evaluates the closest airport for diversion based on one or more of the following operational parameters:

configuration method for airline policy such that a dispatcher may load a configurable policy database as part of an evaluation process and this database will be consumed at both dispatcher and crew applications while evaluating the closest airport;

geo-political reasons preventing selection of certain intermediate airports based on the criticality of an emergency;

traffic related re-routes and level clearance in a busy airspace;

airport wind and weather information;

airport and runway restrictions at intermediate airports;

applicable landing sources availability; and required runway length viability and support from company.

In some embodiments, after detection of an emergency such as an engine out, cabin depressurization, power loss, or other equipment failure event condition, onboard systems invoke the closest airport routine using a mission manager engine, which may provide a best alternative airport based on the current situation and in light of the airliner preference and priority based on the criticality of the emergency event. Because the same mission manager engine will communicate with both the vehicle operator engine and the dispatcher engine, similar results will be presented on the GUIS for both the vehicle operator engine and the dispatcher engine. This results in accurate and real time data sharing and communications between the aircraft crew and dispatcher, allowing for faster and more efficient responses to emergency conditions compared to currently available technological platforms.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Any suitable system infrastructure may be put into place to facilitate joint-decision making between a vehicle operator and a dispatcher. The accompanying drawings and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in the accompanying drawings. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Referring now to the appended drawings, FIG. 1 depicts an exemplary environment in which systems, methods and other aspects of the present disclosure may be implemented. The system 100 may include two joint-decision making system (JDMS) applications, a dispatcher JDMS application 110 implemented in a ground system, and a vehicle operator JDMS application 120 implemented in a vehicle system. The JDMS applications are implemented on both the vehicle operator side (i.e., vehicle operator JDMS application 120) and the dispatcher side (i.e., dispatcher JDMS application 110). The vehicle operator JDMS application 120 is powered by a vehicle operator JDMS engine 125 (e.g., cockpit JDMS engine), and the dispatcher JDMS application is powered by a dispatcher JDMS engine 115 (e.g., ground JDMS engine). The vehicle operator JDMS engine 125 is hosted in an electronic flight bag (EFB), portable electronic device (PED), or other computer located in the cockpit or other location within a vehicle (e.g., an aircraft interface device 127). In some embodiments, the vehicle operator may be an aircraft pilot or a crewmember of an aircraft. The dispatcher JDMS engine 115 is hosted in an airline operations control (AOC) system 117 for use by a dispatcher. The vehicle operator JDMS application 120 provides a vehicle operator GUI 129 for use by the vehicle operator, pilot, crew, and so forth. The dispatcher JDMS application 110 provides a dispatcher GUI 119 for use by the dispatcher, ground crew, and so forth. The dispatcher GUI 119 and the vehicle operator GUI 129 operations may both present what-ifs, closest airports, re-dispatch, and so forth, may be performed and visualized in a three dimensional (3D) flight profile overlaid with weather, traffic and terrain information as discussed further below with respect to the exemplary GUIs depicted in FIGS. 3-4 and 6-14.

As further shown in FIG. 1, the dispatcher JDMS application 110 and the vehicle operator JDMS application 120 each have a dispatcher GUI 119 and vehicle operator GUI 129 respectively, and communications between the dispatcher and the vehicle operator are enabled via a secured connection, for example, via satellite communication manager 130. For example, the vehicle operator and dispatcher communicate using the dispatcher GUI 119 and the vehicle operator GUI 129, and share information in the form of free text, standard messages (e.g., flight planning (FPLN)), images, and files (for weather or other contextual information). In some embodiments, a chat window feature is provided on the dispatcher GUI 119 and vehicle operator GUI 129 for live communication and negotiation and review of decisions between the dispatcher and the vehicle operator. Examples of these features are provided in FIGS. 11 (depicting a message functionality between a vehicle operator engine GUI 610 and a dispatcher GUI 650) and 14 (depicting an ability to take screenshots on a vehicle operator engine GUI 610 and send the screenshots via a message to a dispatcher GUI 650).

As explained above, the dispatcher JDMS application 110 and vehicle operator JDMS application 120 are powered respectively by the dispatcher JDMS engine 115 and vehicle operator JDMS engine 125. The dispatcher JDMS engine 115 and vehicle operator JDMS engine 125 are each responsible for 1) detecting events related to JDMS; 2) retrieving and broadcasting information from aircraft avionics and ground servers; 3) servicing pilot requests for data and information; 4) receiving and generating tail specific trajectory computations; and 5) performing scenario specific functionality. For example, the vehicle operator JDMS engine 125 communicates with a flight management computer 150 (FMC) via a communication manager 140 (e.g., Datalink, Ethernet, Wi-Fi, etc.) and monitors flight parameters received from the flight management computer 150 to detect an engine out condition. When triggered, the vehicle operator JDMS engine 125 retrieves the current aircraft state parameters and runs an "engine out" scenario to identify the closest reachable airports and compute the estimated time of arrival (ETA) and/or fuel required to complete the alternate airport diversion. For example, the vehicle operator JDMS engine 125 may receive information from the flight management computer 150, a weather radar 160 or other LRUs 170 (i.e. line-replaceable units onboard the vehicle). The vehicle operator JDMS engine 125 may also send the event condition trigger as well as the current aircraft state parameters to the dispatcher JDMS engine 115 via satellite communications manager 130 to perform similar computations. In this manner, the vehicle operator JDMS application 120 and the dispatcher JDMS application 110 implemented on both the vehicle operator and dispatcher sides respectively use the same source of information and, as such, the results are consistently rendered on the vehicle operator GUI 129 and dispatcher GUI 119 for joint review and decision-making.

The vehicle operator JDMS engine 125 and dispatcher JDMS engine 115 may periodically share available information via secured communication channels to ensure that both the vehicle operator and dispatcher maintain a consistent situational awareness. For example, the dispatcher JDMS engine 115 retrieves weather information from third party services along the flight path and renders the same on the dispatcher JDMS application 110. The dispatcher JDMS engine 115 also sends this information to the vehicle operator JDMS engine 125 to be rendered for vehicle operator visualization on the vehicle operator GUI 129. Similarly, the vehicle operator JDMS engine 125 may retrieve vehicle information such as flight-related data from the flight management computer 150, weather radar 160, or other LRUs 170, and send the retrieved data to the dispatcher JDMS engine 115 for display on the dispatcher GUI 119.

In some embodiments, the dispatcher JDMS engine 115, vehicle operator JDMS engine 125, dispatcher JDMS application 110, and vehicle operator JDMS application 120 are periodically synchronized to ensure that they work with the same version of the databases, maps/charts, trajectory computation modules, and so forth, to ensure consistency. In case of a mismatch, for example, a NavDB version mismatch, the dispatcher JDMS engine 115 and/or vehicle operator JDMS engine 125 may trigger an error message or send an alert to an operations team for support and installation of a correct version of the NavDB.

In other embodiments, the dispatcher JDMS engine 115, vehicle operator JDMS engine 125, dispatcher JDMS application 110, and vehicle operator JDMS application 120 can also be used for various airline operations, such as maintenance, fuel efficiency and optimization, and flight safety by providing a real-time advisory or decision aid for routine flight operations.

Figure 2:
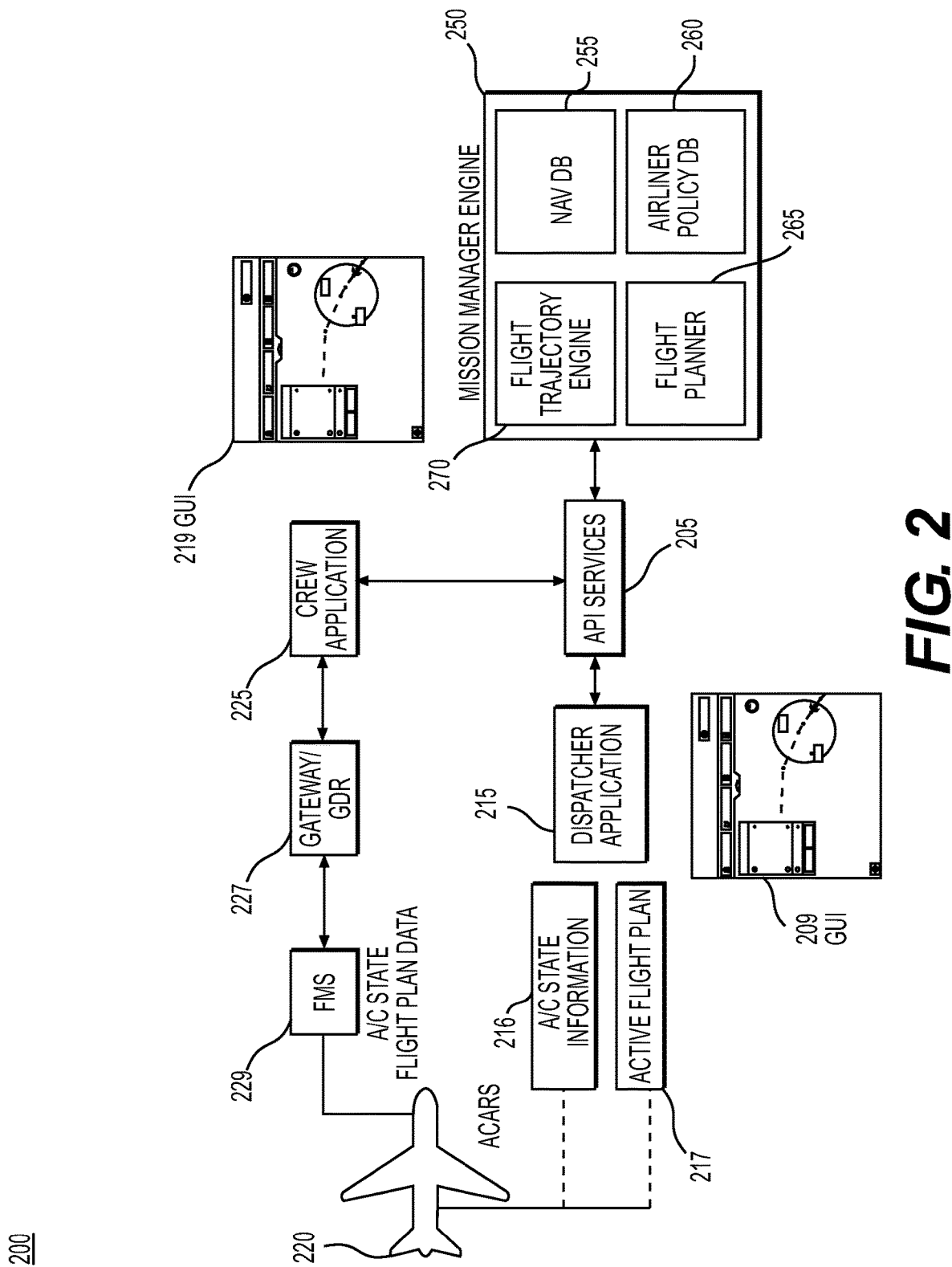
FIG. 2 depicts another exemplary environment in which systems, methods and other aspects of the present disclosure may be implemented, including a shared mission manager engine, according to one or more embodiments.

FIG. 2 depicts another exemplary environment in which systems, methods and other aspects of the present disclosure may be implemented, including a shared mission manager engine, according to one or more embodiments.

A mission manager engine 250 supplies information and functionalities to both the vehicle operator JDMS engine 125 and the dispatcher JDMS engine 115 so that the same exact information is provided to both for viewing and/or further processing. Based on the real time information available and displayed via the vehicle operator GUI 219 and dispatcher GUI 209 respectively, the crew and dispatcher can more quickly come to a common understanding and take necessary actions in a prompt manner during the course of operations of a vehicle. The mission manager engine 250 comprises a flight trajectory engine 270, a flight planner 265, a NavDB 255, and an Airliner Policy DB 260. In one embodiment, the mission manager engine 250 uses aircraft performance data to compute the fuel consumption considering the regulatory fuel policy (e.g., trip fuel, alternate fuel, contingency fuel, etc.). The mission manager engine 250, through API services 205, communicates with both a vehicle operator JDMS application 225 (shown as crew application in FIG. 2) and a dispatcher JDMS application 215 (shown as dispatcher JDMS application 215 in FIG. 2). The vehicle operator onboard an aircraft 220 may interact with the vehicle operator JDMS application 225 via a vehicle operator GUI 219. The vehicle operator JDMS application 225 further communicates with a flight management system 229 via a gateway/GDR 227 onboard the aircraft 220 in order to obtain flight data. A ground-based dispatcher may interact with the dispatcher JDMS application 215 via the dispatcher GUI 209. The dispatcher JDMS application 215 further transmits and receives A/C state information 216 and active flight plan information 217 to and from the aircraft 220.

Figure 3:
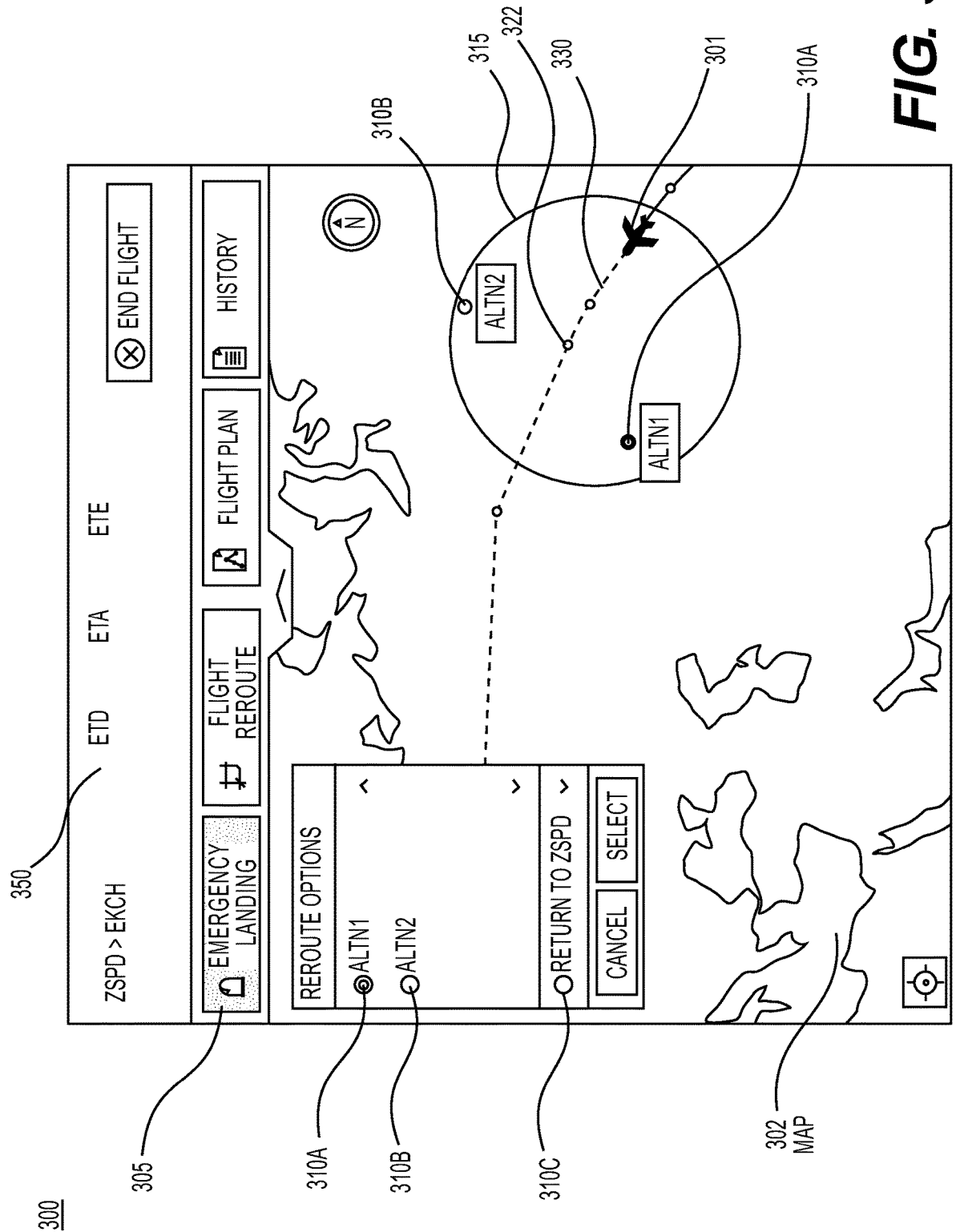
FIG. 3 depicts an exemplary joint-decision making system including a graphical user interface of a vehicle operator engine, according to one or more embodiments.

FIG. 3 depicts an exemplary joint-decision making system including a graphical user interface of a vehicle operator JDMS engine, according to one or more embodiments.

A joint-decision making system 300 includes a vehicle operator GUI 350 presented on a display, including widgets 305 which are selectable by the vehicle operator. Widgets 305 may include, for example, emergency landing, flight reroute, flight plan, and flight history as depicted in FIG. 3. The vehicle operator GUI 350 further includes a real-time map 302, a vehicle icon 301 depicting the location of the vehicle on the real-time map 302 corresponding to the real-time location of the vehicle, and a vehicle flight path 330. The vehicle flight path 330 may include indicators 322 along the vehicle flight path 330 representing anticipated events, for example, changes in direction, altitude, or speed that are expected to occur along the vehicle flight path 330. A vehicle range 315 may be displayed, wherein the range corresponds to the possible range of the aircraft based on fuel requirements, weather or other factors as determined by the mission manager engine 250. In some embodiments, the vehicle operator JDMS engine 125 or the dispatcher JDMS engine 115 may also determine the possible range of the aircraft.

During detection of an event, for example an engine out condition, onboard systems may invoke the closet airport routine using information received from the mission manager engine 250. The mission manager engine 250 may be configured to determine one or more optimal alternative airports for emergency landing based on the current aircraft status, environmental situation, airliner preference and priority based on the criticality of the event, etc. As a single (i.e., central) mission manager engine 250 is used to communicate with both the vehicle operator JDMS engine 125 and the dispatcher JDMS engine 115, same or similar results are displayed on both the dispatcher GUI 119 (not shown in FIG. 3) and vehicle operator GUI 350, ensuring consistency. Additional examples of the dispatcher GUI 119 and the vehicle operator GUI 129 are shown in FIGS. 4 and 6-14.

As further shown in FIG. 3, multiple alternate reroute options 310A, 310B, and 310C are generated and displayed on the vehicle operator GUI 129 such that the vehicle operator or crew is able to evaluate different possible alternate destinations, for example, ALTN1 310A, ALTN2 310B, or return destination 310C. In some embodiments the vehicle is an aircraft, and the alternate reroute options 310A, 310B, and 310C may be airports. The vehicle operator, using the vehicle operator GUI 129, may select the destination, for example, ALTN1 310A, and obtain a depiction of a corresponding route plan on the vehicle operator GUI 129. As a result, the vehicle operator JDMS engine 125 provides the predicted fuel amount and time needed to reach the selected destination based on the flight plan and expected fuel weight at the time of landing. This information will help the vehicle operator and dispatcher quickly decide which airport or route to select for safety and from an operational point of view. This technical solution enables effective joint decision making that is easier, faster, and more accurate than is possible using traditional technological methods.

Figure 4:
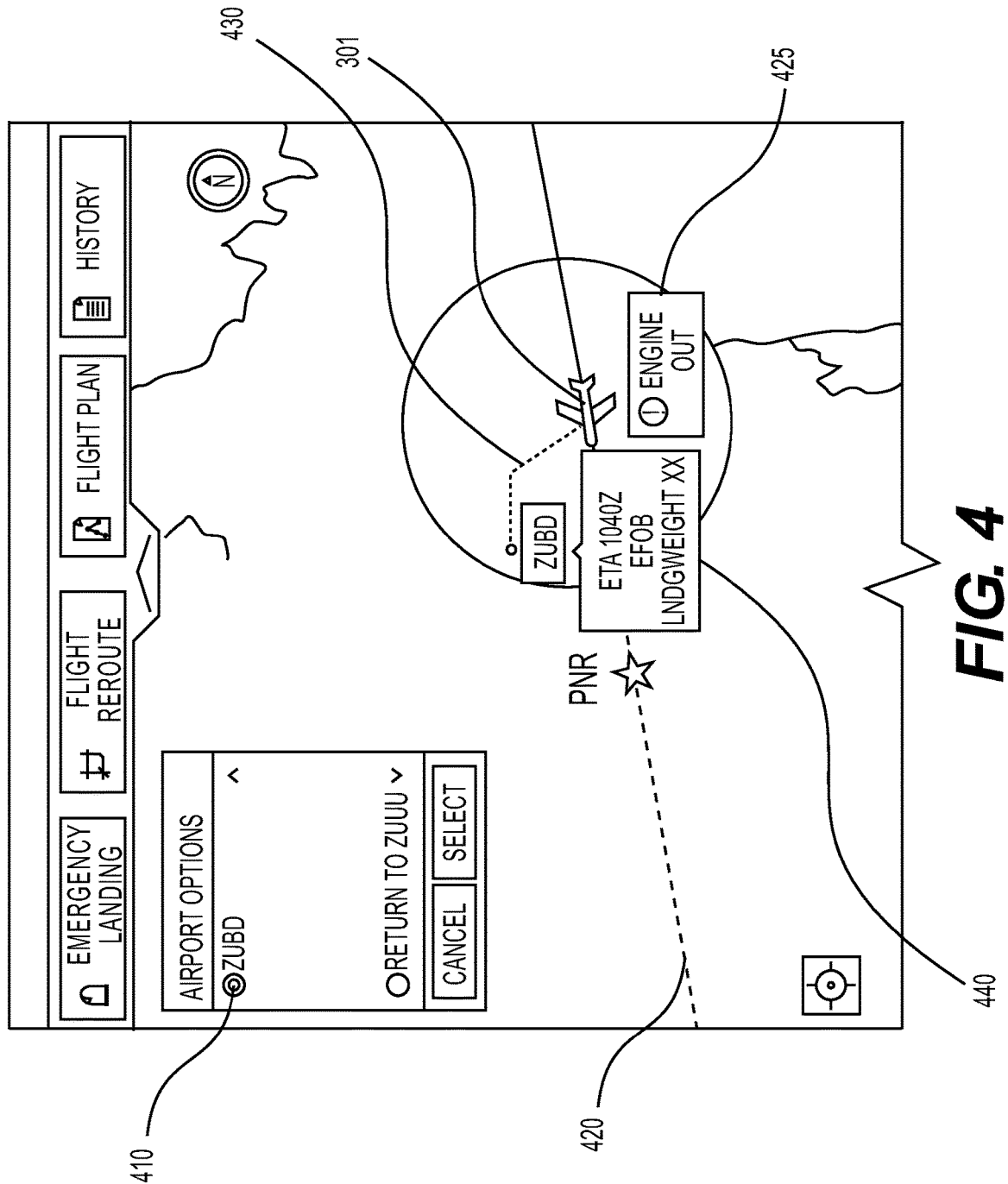
FIG. 4 depicts an exemplary joint-decision making system including a graphical user interface of a vehicle operator engine depicting an engine out event condition, according to one or more embodiments.

FIG. 4 depicts an exemplary joint-decision making system including a vehicle operator GUI of a vehicle operator JDMS engine depicting an engine out event condition, according to one or more embodiments.

The joint-decision making system 400 includes a vehicle operator GUI 129 displaying a vehicle icon 301, an original flight path 420, a reroute destination 410, and an event condition indication 425. As shown in FIG. 4, after a vehicle operator selects a reroute destination 410, for example ZUBD, in response to an event condition indication 425 such as an engine out, the vehicle operator GUI 129 may display route information 440 and an alternate route 430 to the reroute destination 410. Examples of route information 440 that may be displayed include an estimated time of arrival, an amount of fuel remaining, a landing weight, and so forth. While not shown, the dispatcher JDMS engine 115 and dispatcher GUI 119 display same or similar information to the dispatcher. As a result, the vehicle operator and dispatcher are able to share critical information and view the information through the vehicle operator GUI 129 and dispatcher GUI 119 respectively.

Figure 5:
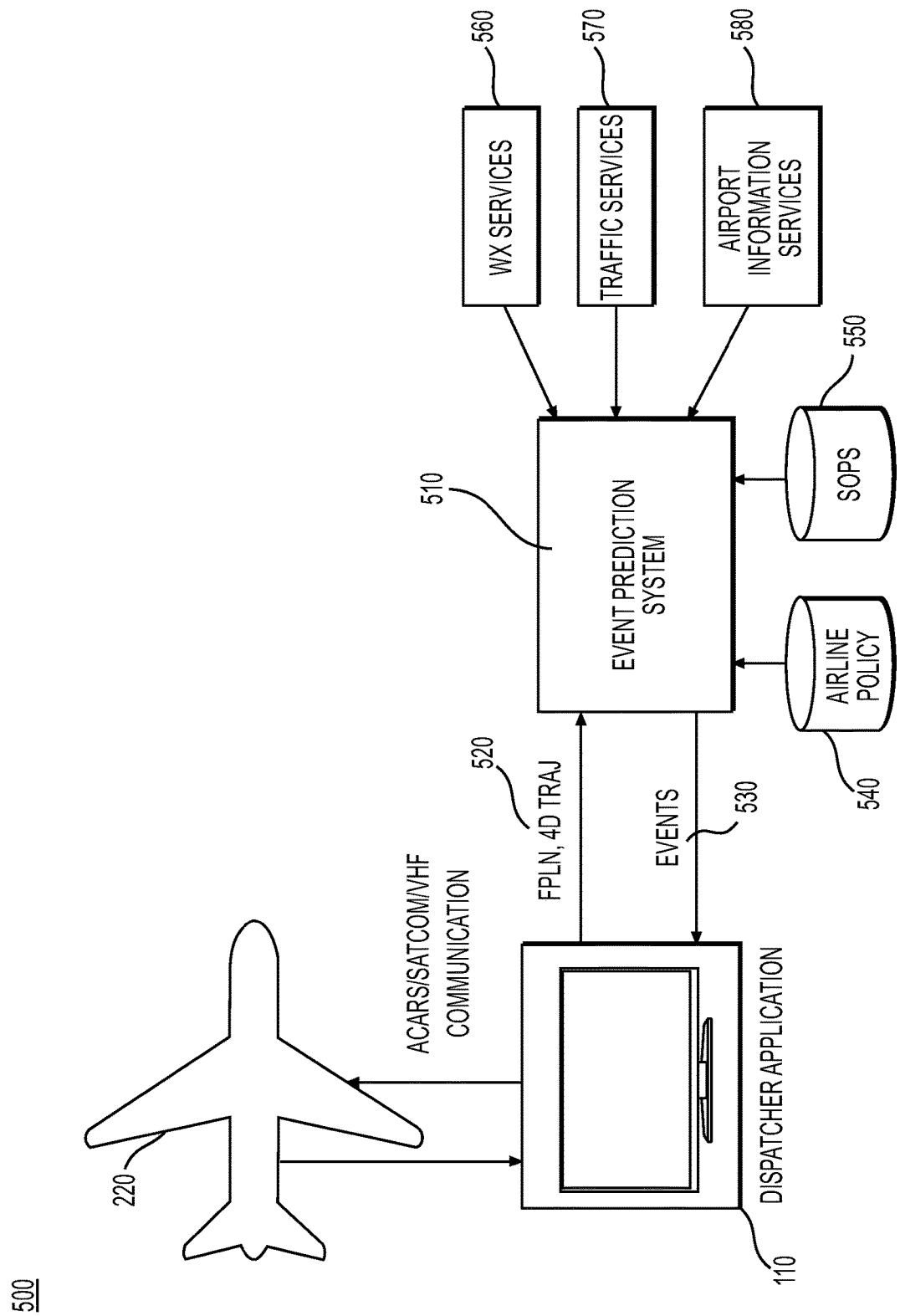
FIG. 5 depicts another exemplary environment in which systems, methods and other aspects of the present disclosure may be implemented including a joint-decision making system, according to one or more embodiments.

FIG. 5 another exemplary environment in which systems, methods and other aspects of the present disclosure may be implemented including a joint-decision making system, according to one or more embodiments.

An exemplary JDMS 500 includes an event prediction system 510 hosted in one or more dispatcher systems (not shown in FIG. 5), and has access to aircraft data 520 received from aircraft 220 via the dispatcher JDMS application 110, internal services data from airline policy database 540 and standard operating procedures database 550, and external services data such as weather services 560, traffic services 570, or airport information services 580. The event prediction system 510 is configured to continuously monitor one or more flights to anticipate predicted events 530 along the route of each aircraft and transmit predicted events 530 to the dispatcher JDMS application 110. The dispatcher JDMS application 110 may be implemented by the dispatcher JDMS engine 115 and presented on the dispatcher GUI 119. The predicted events 530 generated by the event prediction system 510 are integrated on the dispatcher GUI 119 to display details regarding the predicted events 530 as well as options to mitigate.

As further shown in FIG. 5, the event prediction system 510 periodically retrieves operational flight plan data and computed four dimensional (4D) trajectory data associated with the aircraft 220 from the dispatcher JDMS application 110. While only a single aircraft (e.g., aircraft 220) is depicted in FIG. 5, it should be noted that the event prediction system 510 is configured to monitor one or more aircraft simultaneously. In some embodiments, the 4D trajectory is augmented with weather forecast information, traffic information, airport information, etc. received from external services such as weather services 560, traffic services 570, and airport information services 580, to identify any potential disruptions along the flight path. In the event a weather or air traffic disruption is identified, the event prediction system 510 passes the disruption information to the dispatcher JDMS engine 115 (not shown in FIG. 5) and dispatcher JDMS application 110, where the disruption information indicates the nature of the disruption and provides additional information related to the disruption (e.g., information collected from various external services) to allow the dispatcher to take appropriate action. In another embodiment, the event prediction system 510 recommends possible mitigation options based on airline policies received from the airline policy database 540, standard operating procedures received from standard operating procedures database 550, and/or other relevant information such as flight crew operating manuals received from other databases (not shown in FIG. 5).

In some embodiments, the event prediction system 510 evaluates aircraft data 520 such as the 4D trajectory against standard operating procedure violations received from the standard operating procedures database 550 by evaluating one or more parameters, such as speed, cruise altitude, remaining fuel, etc. and determining whether the predicted values would result in a violation. For example, if a 4D trajectory prediction for an aircraft has a predicted speed that is greater than 250 kts below 10000 ft during descent (which would violate standard operating procedures), the event prediction system 510 may send predicted events 530 to the dispatcher JDMS application 110 to notify the dispatcher to alert the aircraft 220 (or the pilot operating the aircraft 220) to take corrective action before entering descent at that speed. The specific attributes may be configured as rules in a configuration policy which includes standard operating procedures and airline specific rules. In some embodiments, this alert is transmitted simultaneously to both the vehicle operator JDMS application 120 and the dispatcher JDMS application 110 for joint decision making with regards to an optimal corrective action.

The event prediction system 510 may also provide a mechanism where information related to certain events such as time delay, hold insertion, excess fuel consumption, or speed restrictions may be modeled into the 4D trajectory, such that the impact of such operational restrictions can be evaluated to predict whether they result in any anomalies.

In some embodiments, the event prediction system 510 includes one or more machine learning applications based on predetermined preferences. In some implementations, output(s) from one or more of the included machine learning applications may become input(s) for different one or more of the machine learning applications to arrive at inference or prediction results. Additionally, one or more of the included machine learning applications may, for example, have streaming analytics capability along with down sampling of data. The prediction engine may, for example, use machine learning applications trained on a training set (e.g., historical flight data and past SOP violations or other contexts) in order to analyze parameters correlated with certain contexts, generate a score for contexts representing a similarity to a given context, and select one or more parameters associated with contexts over a threshold score. In some implementations, the prediction system may analyze prior predictions to train the machine learning applications (e.g., using one or more big data techniques) and determine predictions of violations of SOPs which are required for specific contexts, or data predicted to be necessary. In another embodiment, the machine learning application may be trained with historical flight data (for example Quick Access Record (QAR)), operational flight plan, contextual data such as weather and traffic during the flight. To compute the trajectory of the aircraft as part of the JDMS, one or more of current weather, traffic, and other data collected by the prediction system may be run through the processed model to identify probabilities of events and required actions.

FIG. 6-14 each depict an exemplary joint-decision making system including GUIs of the vehicle operator JDMS engine and the dispatcher JDMS engine, according to one or more embodiments.

Figure 6:
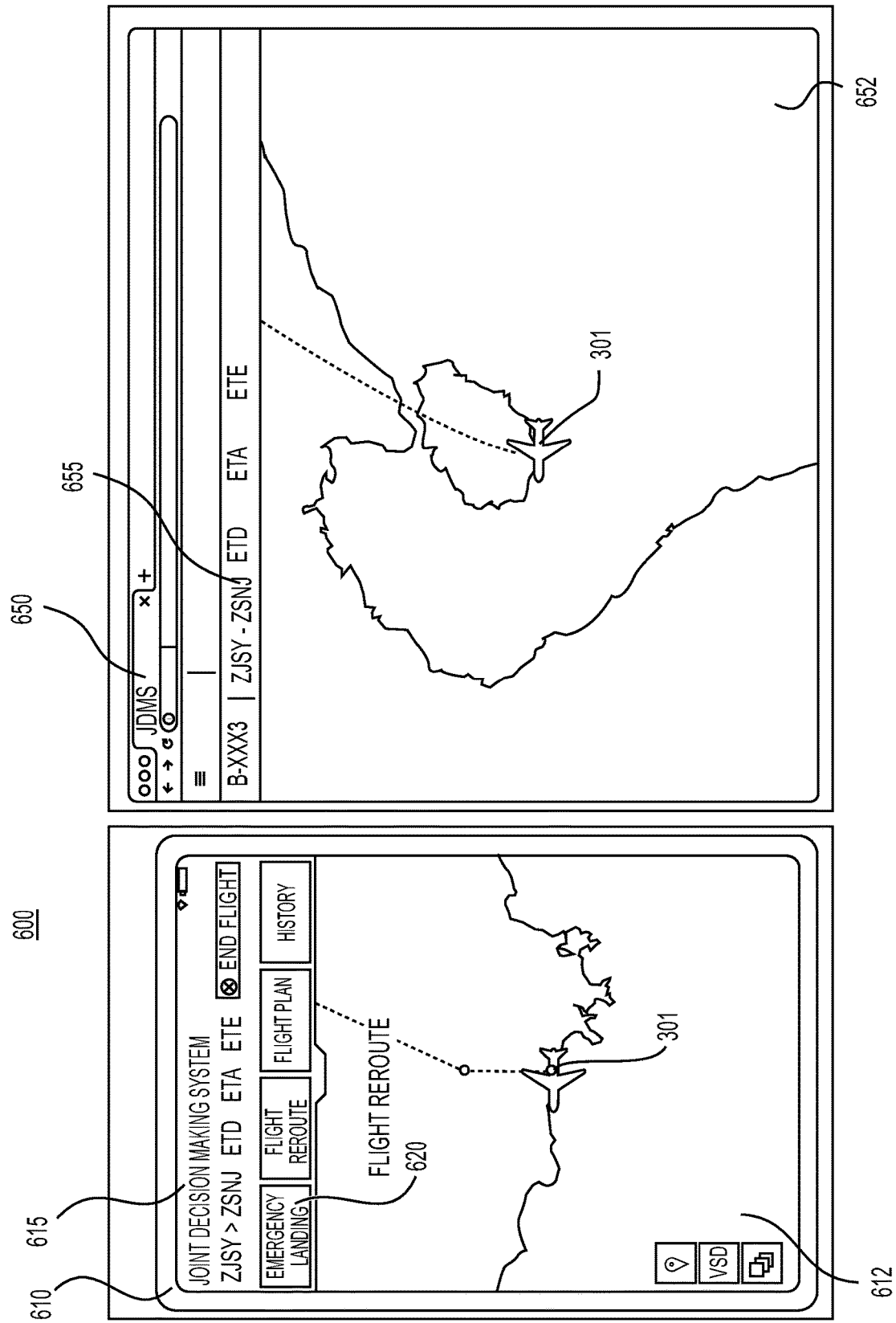
FIG. 6 depicts an exemplary joint-decision making system including a graphical user interface of a vehicle operator engine and of a dispatcher engine in an initial state prior to take-off, according to one or more embodiments.

In FIG. 6, JDMS 600 includes a vehicle operator GUI 610 and a dispatcher GUI 650. The vehicle operator GUI 610 is displayed on an edge device (e.g., a portable electronic device), such as a tablet located or being used in a vehicle, for example, the cockpit of an aircraft. In some embodiments, the edge device is capable of accepting touch inputs from a vehicle operator in order to execute commands or perform other functions enabled on the device. The vehicle operator GUI 610 displays a real-time map 612 and a vehicle icon 301 depicting the real-time location of a vehicle, for example vehicle 220, relative to the ground. As further shown in FIG. 6, the vehicle operator GUI 610 displays route information 615 such as the departure and arrival destinations, estimated departure time, estimated arrival time, and estimated remaining travel time. The vehicle operator GUI 610 provides widgets 620, which may be buttons or commands, for executing flight-related operations, transmitting alerts to a dispatch, or performing other functions. For example, widgets 620 may include buttons for emergency landing and flight reroute, which may allow a pilot to initiate emergency procedures in response to event conditions, such as those shown in FIGS. 9 (rejected takeoff event condition), 10 (offset event triggered), and 12-13 (engine out condition), as well as other event conditions such as cabin depressurization, power loss, equipment failure, maintenance fault, or efficiency opportunity. In some embodiments, an event condition is automatically detected by onboard local or external systems or local sensors, for example, by a flight management computer 150, weather radar 160, or LRUs 170, and emergency procedure suggestions are automatically initiated by the vehicle operator JDMS engine 125. The vehicle operator GUI 610 also allows a vehicle operator to review the flight plan or historical information for the flight, as well as end the vehicle operator GUI 610 for the current flight once the flight is complete. The vehicle operator GUI 610 may also include other functionalities for communicating with a dispatcher as discussed below with respect to FIGS. 11 and 14. For example, the vehicle operator GUI 610 may enable the vehicle operator to take screenshots of the vehicle operator GUI 610 presented on the display, zoom in and out on the display, or select other functions or options as they are presented on the vehicle operator GUI 610. The vehicle operator GUI 610 and dispatcher GUI 650 may both also, for example, display a vertical profile of the aircraft showing past as well as predicted altitudes for the aircraft as discussed below with respect to FIG. 8.

Figure 7:
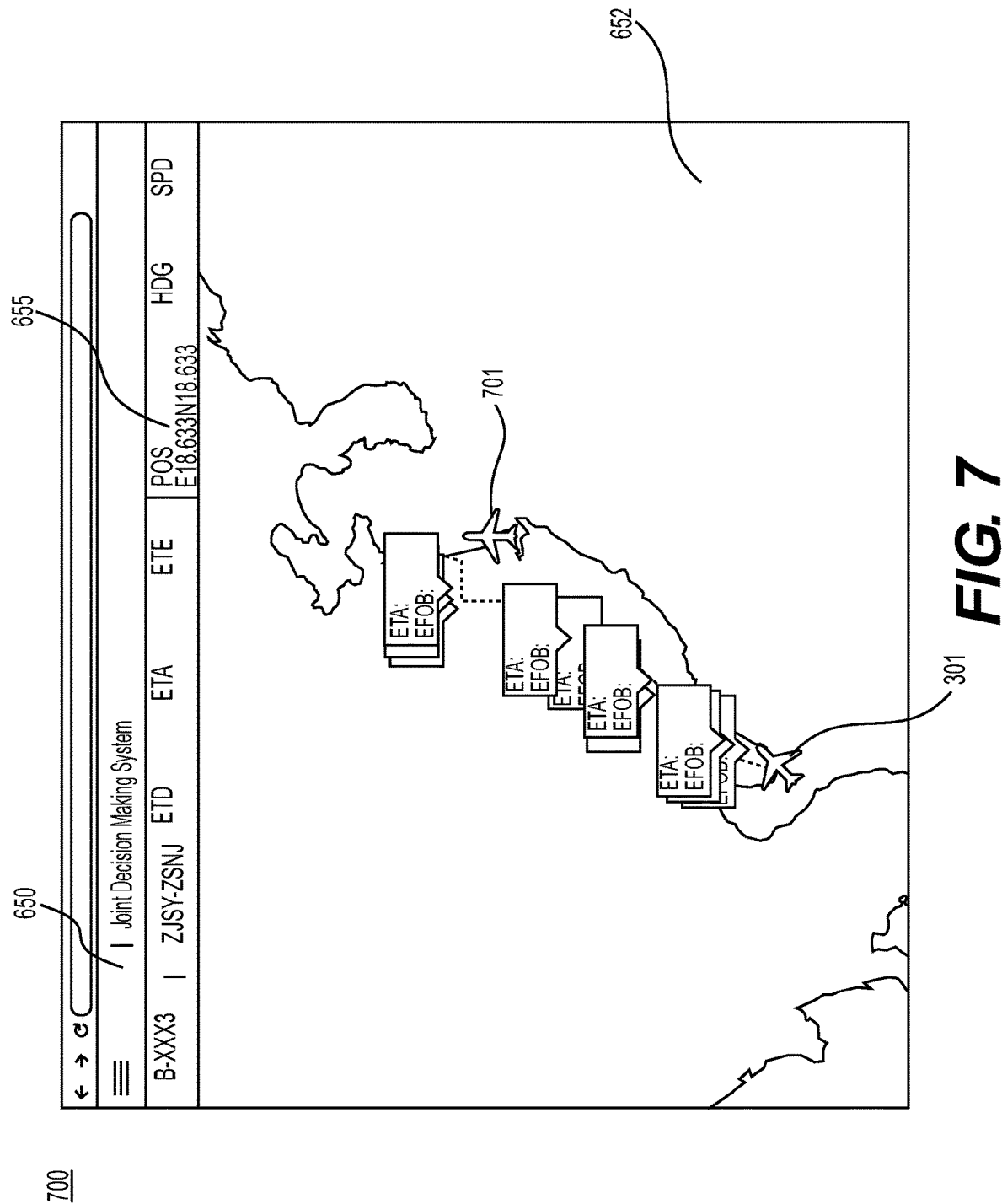
FIG. 7 depicts an exemplary joint-decision making system including a graphical user interface of a dispatcher engine, according to one or more embodiments.

As further shown in FIG. 6, a dispatcher GUI 650 (right) is generated based on the same data sets as the vehicle operator GUI 610. Through the dispatcher GUI 650, a dispatcher may monitor the location of multiple vehicles and/or select a vehicle icon 301 representing a vehicle. In some embodiments, additional aircraft may be selected and monitored, as shown for example in FIG. 7. For vehicle icon 301, similar information as displayed on the vehicle operator GUI 610 is also displayed on the dispatcher GUI 650. For example, the dispatcher GUI 650 displays a real-time map 652 and vehicle icon 301 depicting the location of the vehicle relative to the ground, and when vehicle icon 301 is selected, additional information may be displayed, such as route information 655 discussed below. Again, in some embodiments, the dispatcher GUI 650 will display multiple aircraft and their locations relative to ground as shown in FIG. 7. As further shown in FIGS. 6 and 7, the dispatcher GUI 650 displays route information 655 such as the departure and arrival airports, estimated departure time, estimated arrival time, and estimated remaining travel time for the vehicle associated with vehicle icon 301. In some embodiments, the vehicle operator JDMS engine 125 and dispatcher JDMS engine 115 (not shown in FIG. 6) are synchronized with flight-related data being updated in real time such that the vehicle operator JDMS application 120 and the dispatcher JDMS application 110 are receiving the same information and displaying that information on the vehicle operator GUI 129 and dispatcher GUI 119, respectively. The dispatcher GUI 119 may display more, less, or the same information compared to the vehicle operator GUI 129.

FIG. 7 depicts a dispatcher application 700 including a dispatcher GUI 650. The dispatcher GUI 650 presents route information 655, a vehicle icon 301, an additional vehicle icon 701, and a real-time map 652. Each vehicle icon 301 is associated with a vehicle, such as an aircraft. While two vehicle icons are depicted here, the dispatcher GUI 650 may display additional vehicle icons representing the locations of vehicles in real time relative to ground. A dispatcher is able to select a vehicle icon, for example, vehicle icon 301, and cause display of route information 655 corresponding to the vehicle associated with the vehicle icon 301. In this manner, a dispatcher can continuously monitor and obtain real-time location and route information for multiple aircraft simultaneously.

Figure 8:
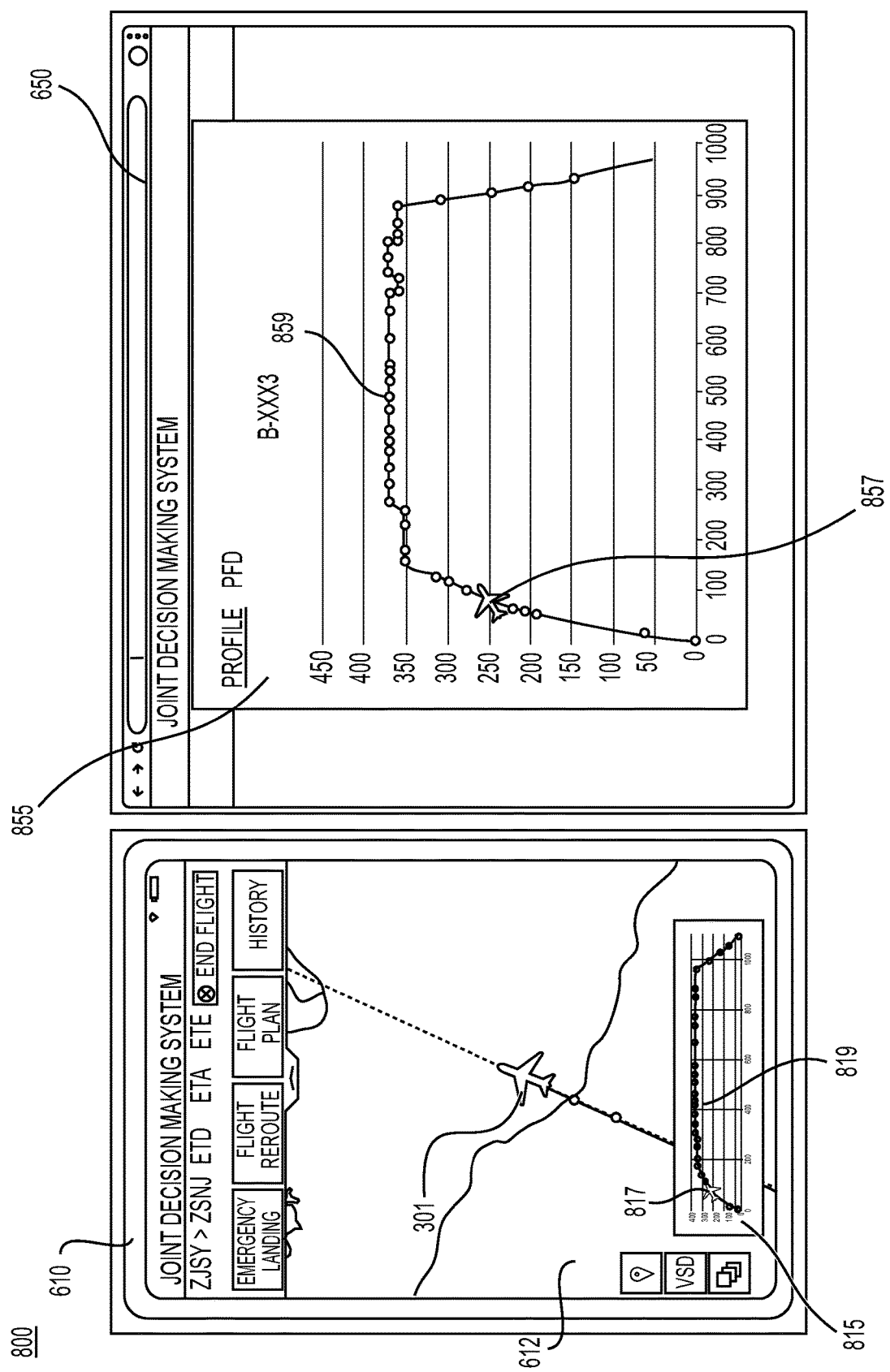
FIG. 8 depicts an exemplary joint-decision making system including a graphical user interface of a vehicle operator engine and of a dispatcher engine showing the vertical profile of an aircraft, according to one or more embodiments.

FIG. 8 presents an exemplary JDMS 800 including a vehicle operator GUI 610 and a dispatcher GUI 650. The vehicle operator GUI 610 presents a vehicle icon 301 corresponding to a vehicle, a real-time map 612, and other information as discussed above with respect to FIG. 6. Additionally, the vehicle operator GUI 610 may further present an altitude indicator 815 which includes an aircraft altitude icon 817 and a predicted aircraft altitude 819. The altitude indicator 815 allows the vehicle operator to monitor current, prior, and expected cruise altitudes over the course of the route of the vehicle depicted by vehicle icon 301. The dispatcher GUI 650 may display similar information on an aircraft altitude indicator 855, including an aircraft altitude icon 857 and a predicted aircraft altitude 859. The vehicle operator GUI 610 and the dispatcher GUI 650 in some embodiments receive altitude information from the same source, for example, from onboard aircraft systems or from a mission manager engine 250. In this manner, the same or similar information is presented in real-time on both the vehicle operator GUI 610 and the dispatcher GUI 650, resulting in an improved communication interface and improved communications between a dispatcher and a vehicle operator.

Figure 9:
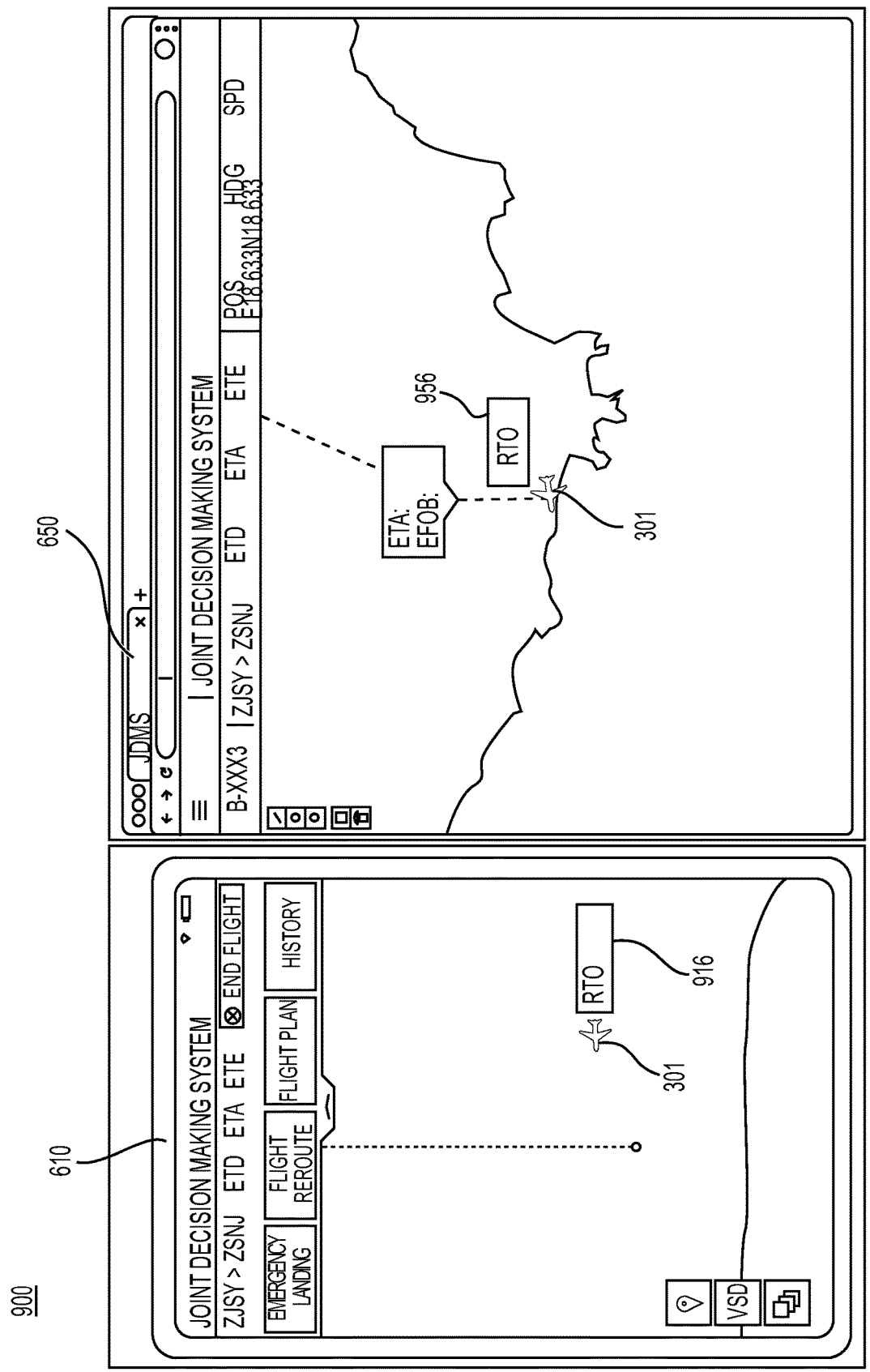
FIG. 9 depicts an exemplary joint-decision making system including a graphical user interface of a vehicle operator engine and of a dispatcher engine showing a rejected takeoff event condition, according to one or more embodiments.
Figure 10:
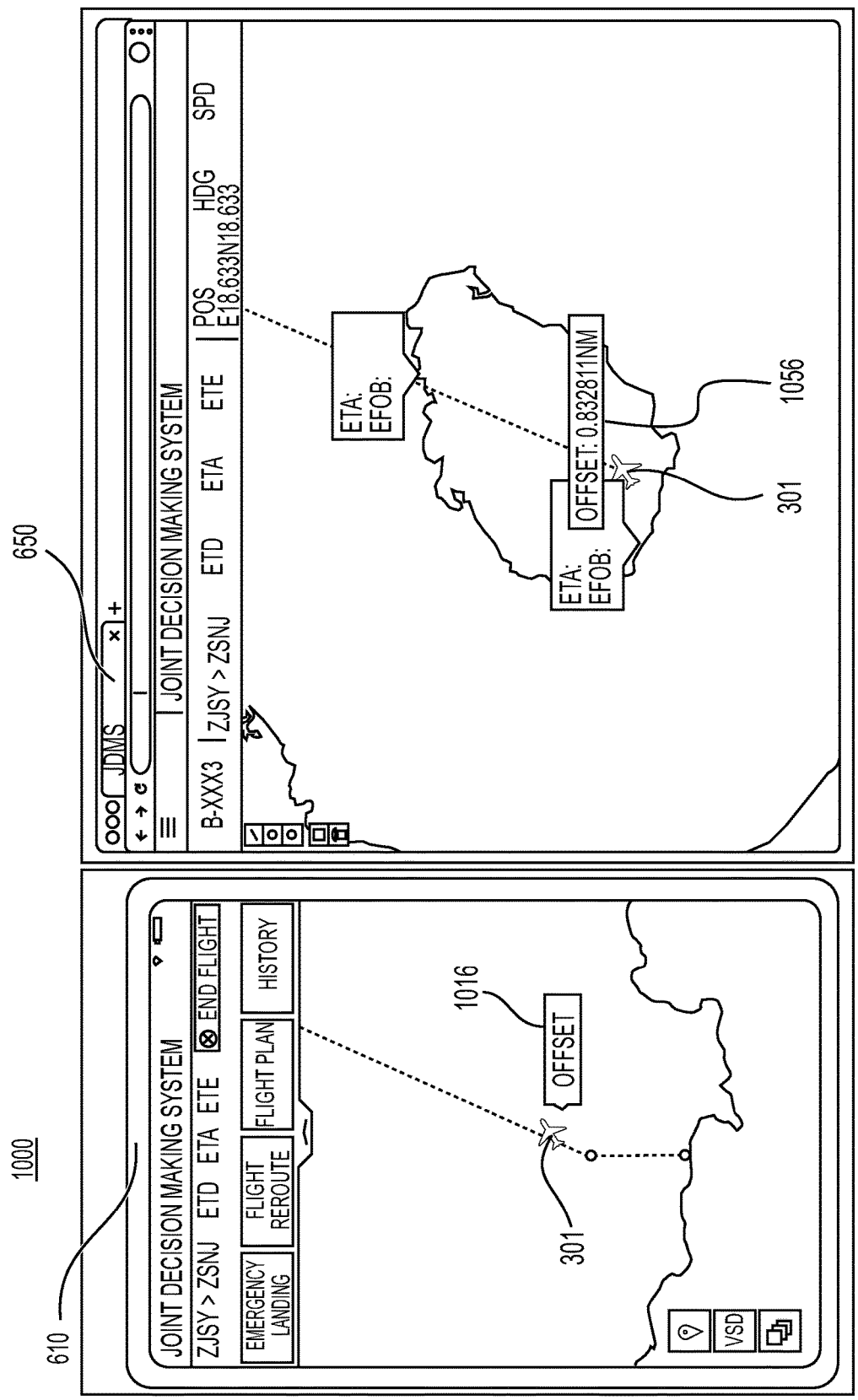
FIG. 10 depicts an exemplary joint-decision making system including a graphical user interface of a vehicle operator engine and a dispatcher engine showing an offset event condition, according to one or more embodiments.
Figure 12:
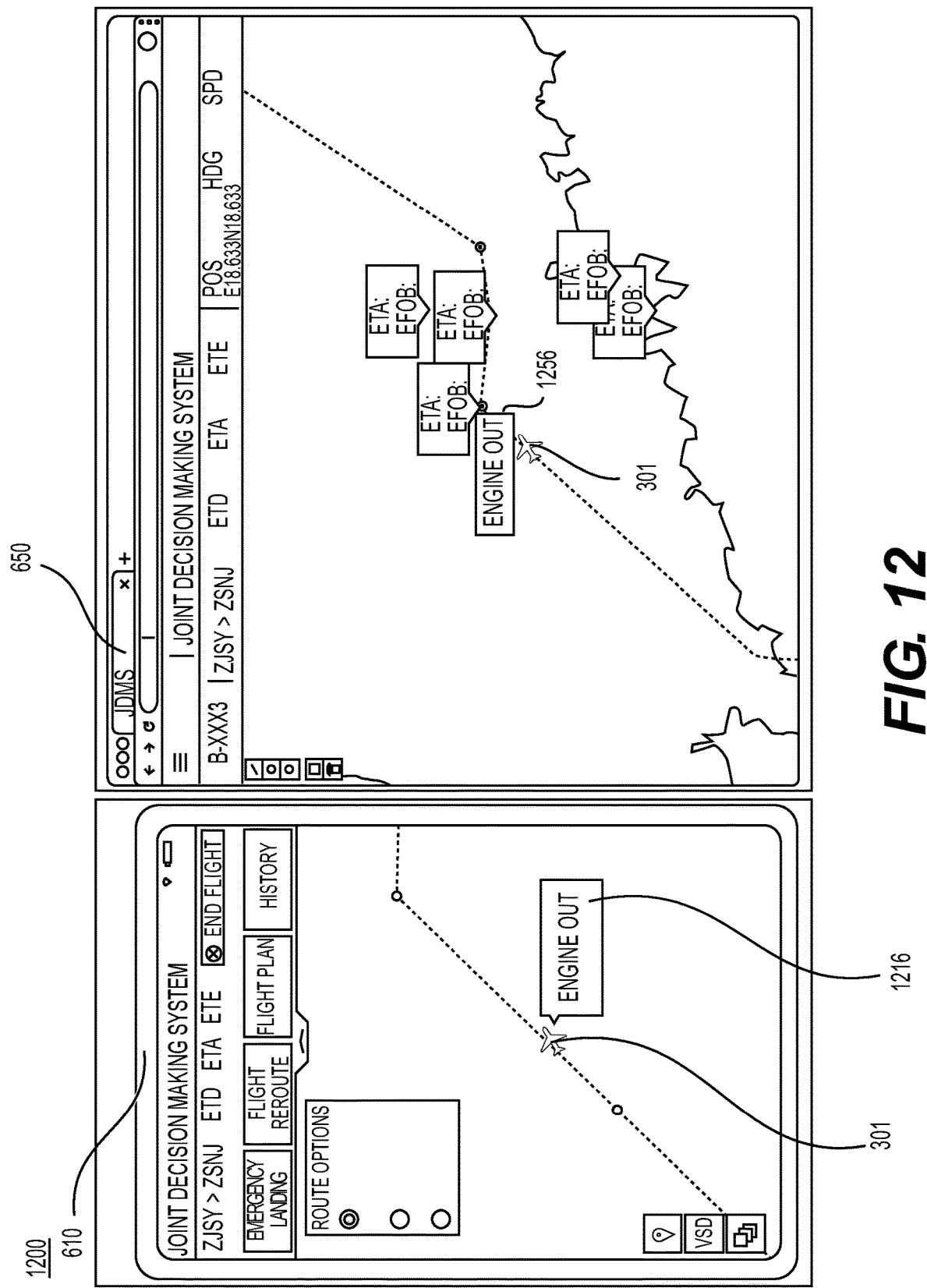
FIG. 12 depicts an exemplary joint-decision making system including a graphical user interface of a vehicle operator engine and of a dispatcher engine showing an engine out event condition, according to one or more embodiments.
Figure 13:
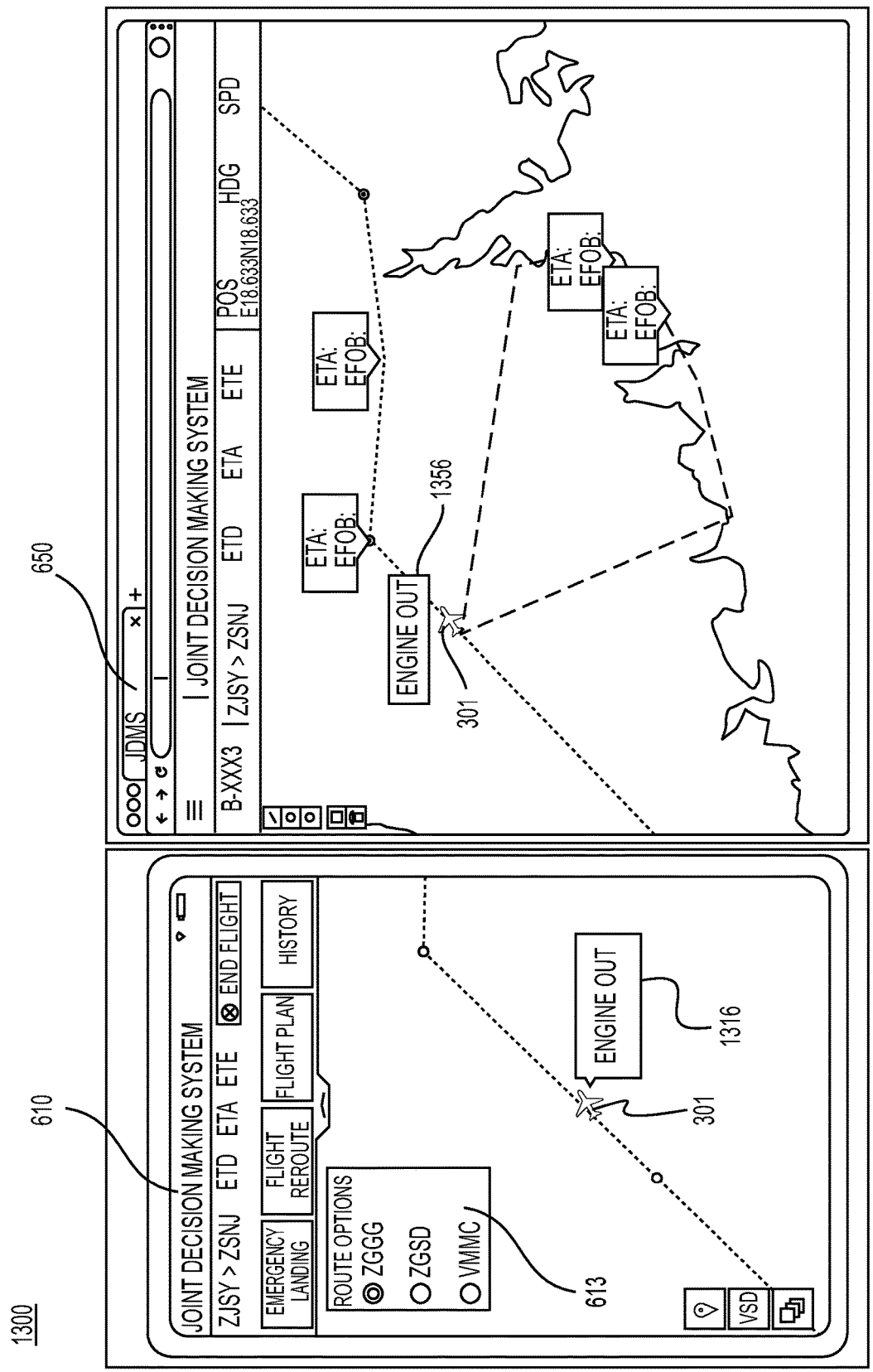
FIG. 13 depicts an exemplary Joint-Decision Making System including a graphical user interface of the vehicle operator engine and of a dispatcher engine showing reroute options in response to an engine out condition, according to one or more embodiments.

As shown in FIGS. 9, 10, and 12, when an event condition is triggered or detected, the vehicle operator GUI 610 and dispatcher GUI 650 are updated to display an indication of the event. For example, as shown in FIG. 9 with respect to an exemplary JDMS 900, when a rejected takeoff (RTO) is detected, the vehicle operator GUI 610 and dispatcher GUI 650 are updated substantially in real time to indicate the RTO. For example, the color of the vehicle icon 301 may change to a different color, for example orange, and an indicator 916 or 956 indicating the type of event appears on the screen next to the vehicle icon 301 with the corresponding event information as shown in FIG. 9. Similarly, as shown in FIG. 10 with respect to an exemplary JDMS 1000, when an offset event is triggered, for example, if the aircraft must deviate from the planned flight path, the color of the vehicle icon 301 depicted on the screen may change to a different color, for example yellow, and an event indicator 1016 or event indicator 1056 indicating the type of event appears next to the vehicle icon 301. The vehicle icon 301 may revert back to the default color and the event indicator 1016 or 1056 may be removed once the event condition has ended, e.g., when the aircraft has returned to the original flight plan. Further, additional information may be displayed on the dispatcher GUI 650 related to the event condition, as illustrated within the event indicator 1056. FIG. 12 depicts exemplary GUIs 1200 when an engine out event is triggered. For example, the vehicle icon 301 depicted on both the vehicle operator GUI 610 and dispatcher GUI 650 may change to a different color, for example red, and indicators 1216 and 1256 indicating the type of event may respectively be displayed next to the vehicle icon 301. Further, additional functionalities may be presented to the operator and/or dispatcher upon detection of an engine out. For example, as shown in FIG. 13 with respect to an exemplary JDMS 1300, in response to an engine out condition, a set of possible reroute options 613 are presented on the vehicle operator GUI 610, where the reroute options are determined, as discussed above, based on distance, fuel, tail-specifications, weather, geopolitical concerns, and/or other factors relevant to the decision. Additionally, the vehicle icon 301 may change to a different color and the event indicators 1316 and 1356 may be displayed on the vehicle operator GUI 610 and dispatcher GUI 650 respectively.

Figure 11:
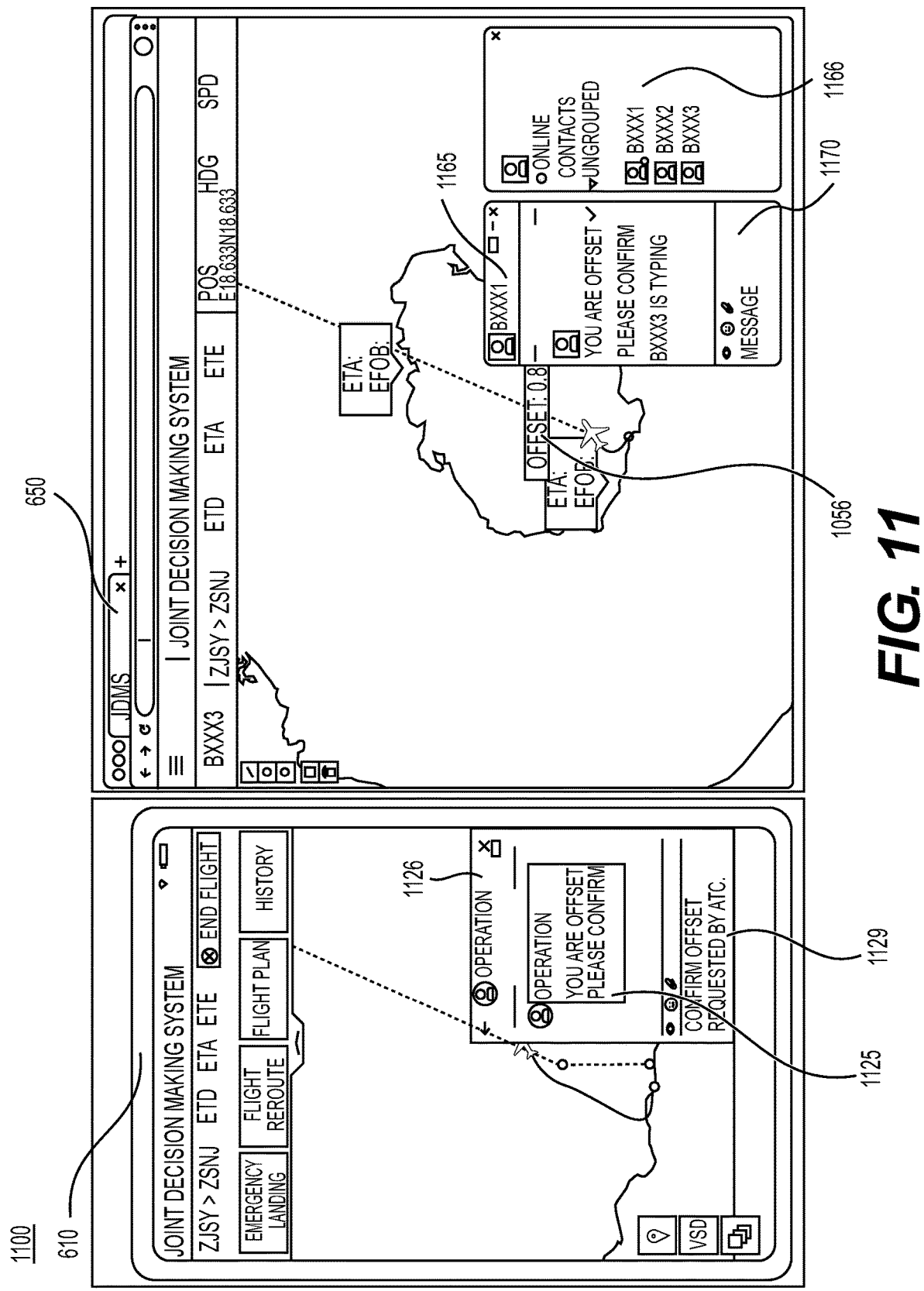
FIG. 11 depicts an exemplary joint-decision making system including a graphical user interface of the vehicle operator engine and of a dispatcher engine showing text-based messaging features following an offset event condition, according to one or more embodiments.

In some embodiments, the vehicle operator JDMS engine 125 and the dispatcher JDMS engine 115 include a built-in natural language text chat feature for facilitating communication of information between the dispatcher and a vehicle operator. Examples of these chat features are disclosed in the exemplary JDMS 1100 in FIG. 11 and the exemplary JDMS 1400 in FIG. 14. For example, a chat box feature may be presented that is opened and closed upon clicking a message indicator displayed on the vehicle operator GUI 610 and dispatcher GUI 650. Upon detection of an offset as described above in FIG. 10, a dispatcher may select the corresponding aircraft in a contact list 1166 and input text 1170 into a message box 1165 via the dispatcher GUI 650 as shown in FIG. 11. For example, the dispatcher might input text 1170, for example "Please confirm you are offset" into the message box 1165 displayed on the dispatcher GUI 650. The message may then be transmitted to a vehicle operator JDMS engine 125 (not shown in FIG. 11) and displayed as a message 1125 in a corresponding message box 1126 displayed on the vehicle operator GUI 610 as also shown in FIG. 11. The pilot or vehicle operator may then type in text 1129, for example a response to the dispatcher confirming that the aircraft is offset. In this manner, a dispatcher and pilot can communicate and keep track of their conversation without the need to engage in voice communications.

Figure 14:
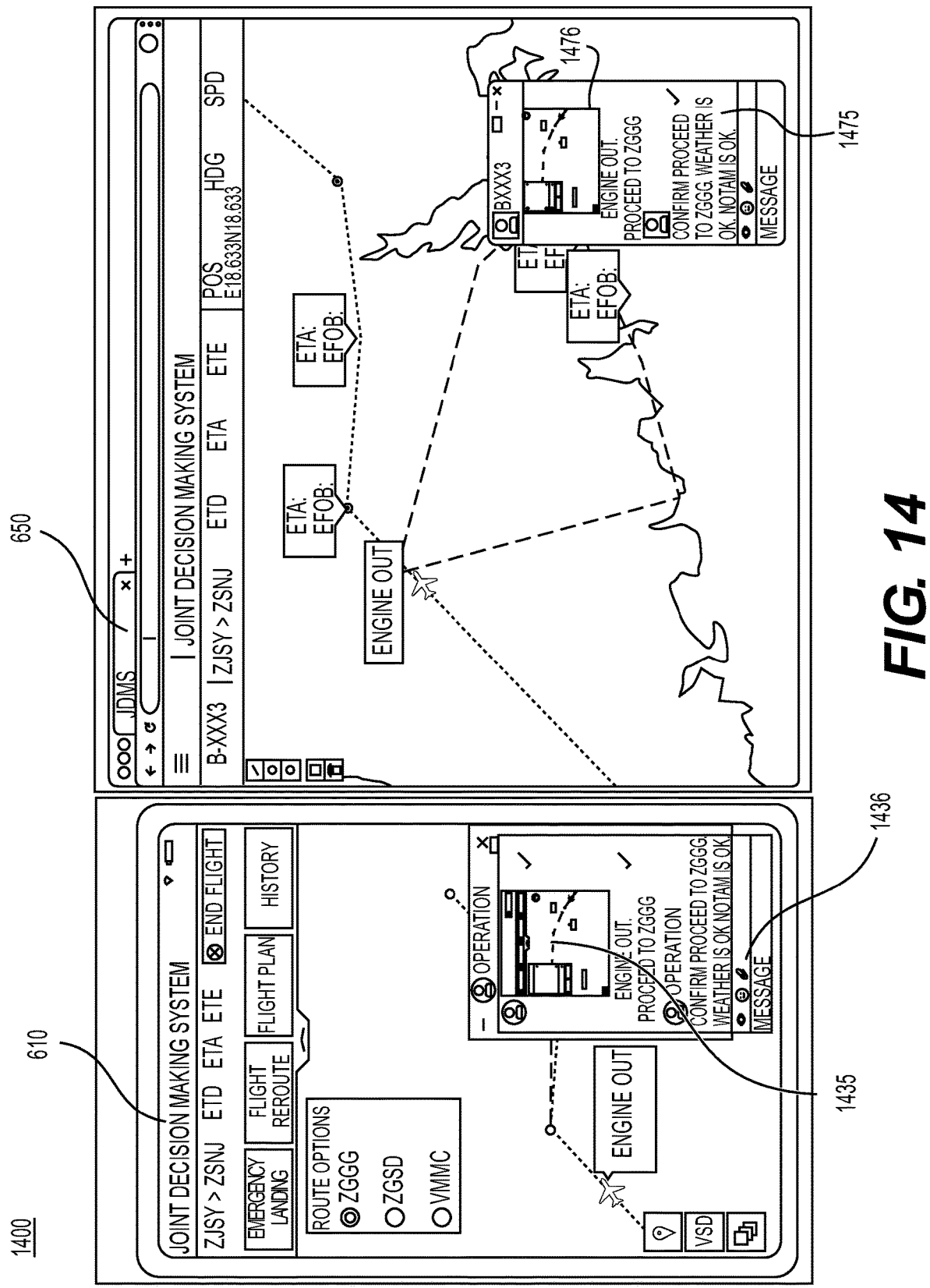
FIG. 14 depicts an exemplary joint-decision making system including a graphical user interface of a vehicle operator engine and of a dispatcher engine showing messaging features enabling, for example, transmission of screenshots of the graphical user interface in response to an engine out condition, according to one or more embodiments.

FIG. 14 depicts additional functionalities related to the messaging features. In response to an event condition, the vehicle operator GUI 610 enables a pilot to take a screenshot 1435 of the vehicle operator GUI 610, and transmit the screenshot 1435 via an attachment function 1436 to the dispatcher GUI 650, which may be depicted as the screenshot 1476 on the dispatcher GUI 650. Further, the dispatcher may then confirm receipt as well as share additional information via a message 1475. Thus, messages containing natural language text, images, files, or other information be transmitted between the vehicle operator GUI 610 and the dispatcher GUI 650. In this manner an agreement can be reached between the dispatcher and the pilot quickly and in a fraction of the time required using current technological methods.

Figure 15:
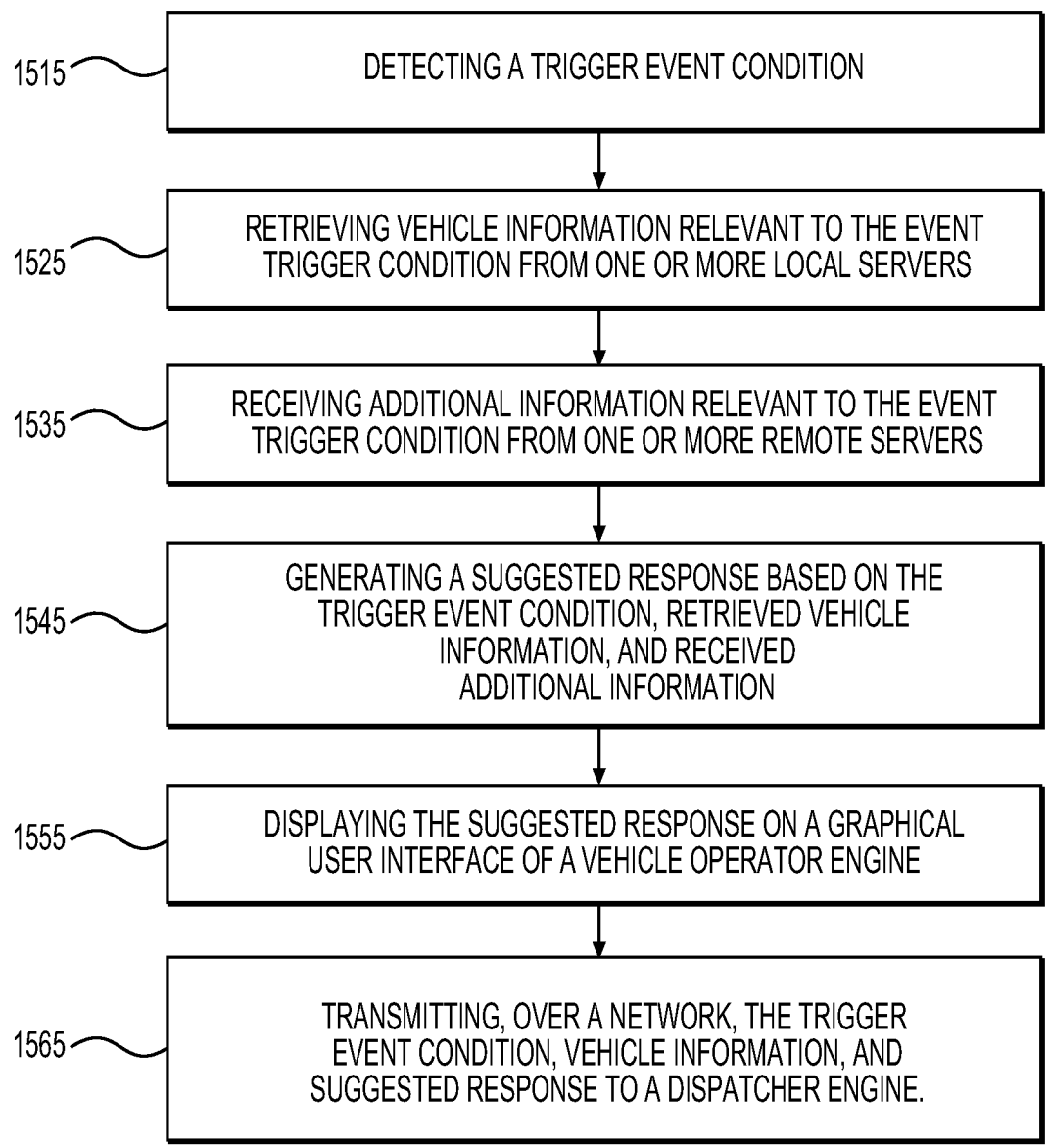
FIG. 15 depicts a flowchart illustrating an exemplary method for joint-decision making between a vehicle and a dispatcher, according to one or more embodiments.

FIG. 15 depicts a flowchart illustrating an exemplary method of joint-decision making between a vehicle and a dispatcher, according to one or more embodiments. Method 1500 may be performed by one or more components of the systems 100 or 200 described above in reference to FIGS. 1 and 2. In step 1515, a trigger event condition may be detected by one or more processors of a vehicle operator JDMS engine 125 onboard a vehicle such as aircraft 220. The trigger event condition may be a condition described above with respect to FIGS. 1-14, including for example an engine out, cabin depressurization, power loss, other equipment failure, rejected take-off, reroute recommendation, maintenance fault, efficiency opportunity, and so forth. At step 1525, vehicle information relevant to the trigger event condition may be retrieved by the vehicle operator JDMS engine 125 from one or more local servers. For example, local servers may be databases onboard a vehicle such as aircraft 220. In some embodiments, the vehicle operator JDMS engine 125 may retrieve vehicle information related to the event trigger condition directly from sensors or other components onboard the vehicle instead of, or in addition to, a local server. At step 1535, additional information relevant to the event trigger condition may be obtained by the vehicle operator JDMS engine 125 from one or more remote servers as described above with respect to FIGS. 1-2. For example, additional information may be obtained from remote servers based with external services such as weather services 560, traffic services 570, and airport information services 580 discussed above with respect to FIG. 1. In some embodiments, the vehicle operator JDMS engine 125 may receive additional information via a dispatcher JDMS engine 115. In additional embodiments, the vehicle operator JDMS engine 125 may receive additional information from a mission manager engine 250 through API services 205 as described above with respect to FIG. 2. Additional information may also be obtained from an airline policy database 540 or a standard operating procedures database 550 as explained above with respect to FIG. 5. At step 1545, the vehicle operator JDMS engine 125 may generate a suggested response or course of action based on the trigger event condition, vehicle information, and additional information. In some embodiments, the vehicle operator JDMS engine 125 may automatically implement the response onboard the vehicle without input from the vehicle operator. For example, the vehicle operator JDMS engine 125 may automatically initiate a reroute procedure based upon the suggested response or course of action without the need for a dispatcher or vehicle operator to select a response. At step 1555, the JDMS engine 125 may display the suggested response or course of action on a graphical user interface of the vehicle operator engine using a vehicle operator JDMS application 120. While a GUI is discussed, other types of interfaces (e.g., voice interfaces, motion-tracking interfaces, etc.) are contemplated within this disclosure. At step 1565, the vehicle operator JDMS engine 125 may transmit, over a network, the trigger event condition, vehicle information, and the suggested response or course of action to a dispatcher JDMS engine 115. In this manner, both the vehicle operator JDMS engine 125 and the dispatcher JDMS engine 115 may generate and display information based on real-time data in a consistent manner. In an alternative embodiments, one or more processors of the mission manager engine 250 may perform the above steps 1515-1555 instead of the vehicle operator JDMS engine 125, and at step 1565 may transmit the trigger event condition, vehicle information, and the suggested response or course of action to the dispatcher JDMS engine 115 and the vehicle operator JDMS engine 125.

Figure 16:
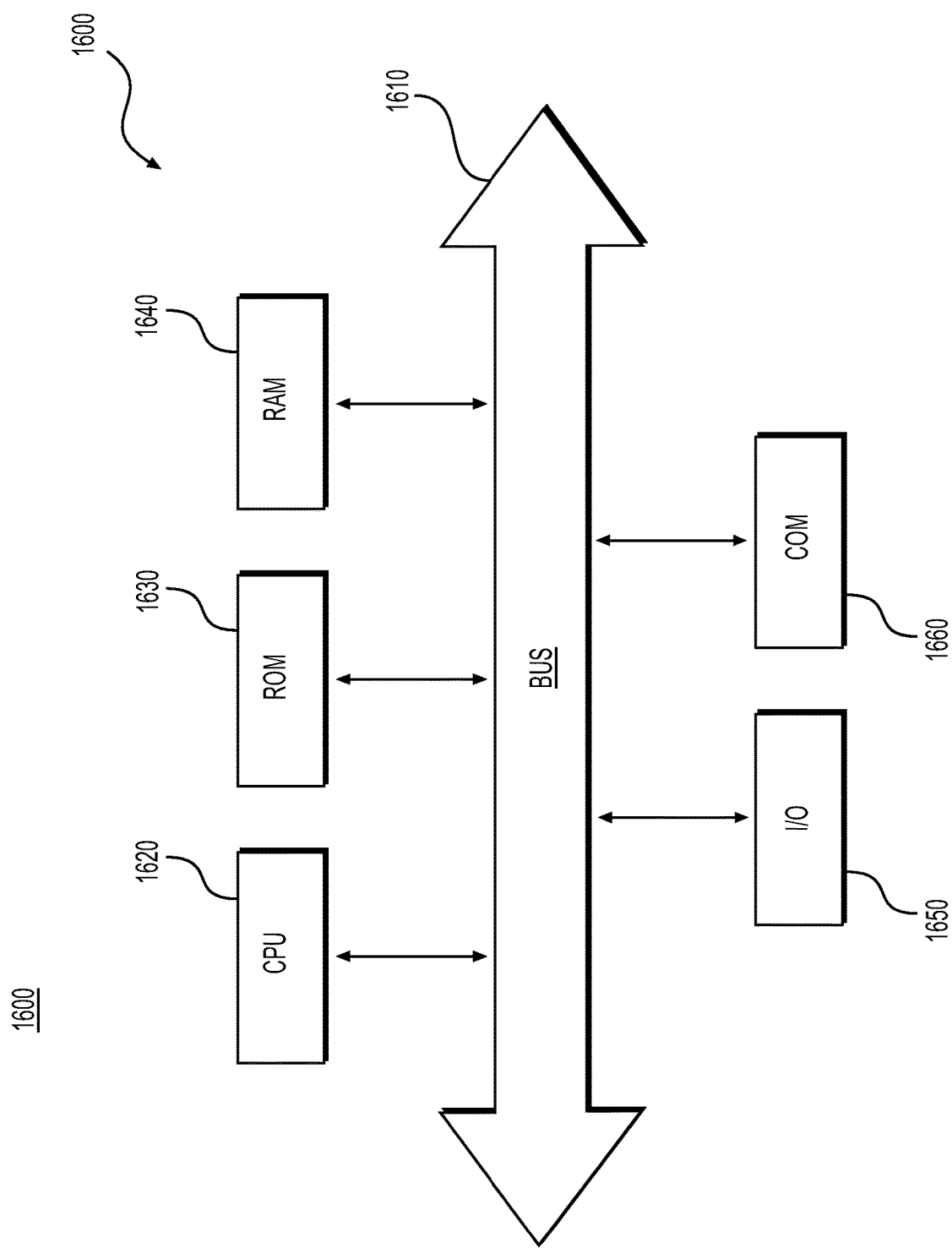
FIG. 16 depicts an exemplary computer device or system, in which embodiments of the present disclosure, or portions thereof, may be implemented.

Various embodiments of the present disclosure, as described above in the examples of FIGS. 1-15, may be implemented using one or more of the device 1600 in FIG. 16. As shown in FIG. 16, the device 1600 may include a central processing unit (CPU) 1620. CPU 1620 may be any type of processor device including, for example, any type of special purpose or a general-purpose microprocessor device. As will be appreciated by persons skilled in the relevant art, CPU 1620 also may be a single processor in a multi-core/multiprocessor system, such system operating alone, or in a cluster of computing devices operating in a cluster or server farm. CPU 1620 may be connected to a data communication infrastructure 1610, for example, a bus, message queue, network, or multi-core message-passing scheme.

Device 1600 also may include a main memory 1640, such as, for example, random access memory (RAM), and also may include a secondary memory 1630. Secondary memory 1630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1630 may include other similar means for allowing computer programs or other instructions to be loaded into device 1600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1600.

Device 1600 also may include a communications interface ("COM") 1660. Communications interface 1660 allows software and data to be transferred between device 1600 and external devices. Communications interface 1660 may include a modem, a network interface (such as an Ethernet card), a communications port, a PCMCIA slot and card, or the like. Software and data transferred via communications interface 1660 may be in the form of signals, which may be electronic, electromagnetic, optical, or other signals capable of being received by communications interface 1660. These signals may be provided to communications interface 1660 via a communications path of device 1600, which may be implemented using, for example, wire or cable, fiber optics, a phone line, a cellular phone link, an RF link, or other communications channels.

The hardware elements, operating systems and programming languages of such equipment are conventional in nature, and it is presumed that those skilled in the art are adequately familiar therewith. Device 1600 also may include input and output ports 1650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

After reading this description, it will become apparent to a person skilled in the relevant art how to implement embodiments of the present disclosure using these or other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

It should be appreciated that in the above description of exemplary embodiments of the present description, various features of the present description are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of the present description.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the present disclosure, and it is intended to claim all such changes and modifications as falling within the scope of the present disclosure. For example, functionality may be added or deleted from the block diagrams and operations may be interchanged among functional blocks. Steps may be added to, deleted from, or repeated, in methods described herein, while remaining within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. It is intended that the specification and examples be considered as exemplary only, with a true scope and spirit of the disclosure being indicated by the following claims.

What is claimed is:

1. A joint-decision making system for vehicle operator and dispatcher interfacing, the system comprising:
    a vehicle operator engine implemented on a vehicle system comprising one or more processors configured to:
        detect a trigger event condition;
        retrieve vehicle information relevant to the event trigger condition from one or more local servers;
        receive external information relevant to the event trigger condition over a network from one or more remote servers;
        generate a suggested response based on the trigger event condition, retrieved vehicle information, and received external information;
        display the suggested response on a graphical user interface of the vehicle operator engine; and
        transmit, over a network, the trigger event condition, vehicle information, and suggested response to a dispatcher engine; and
    the dispatcher engine implemented on a ground system comprising one or more processors configured to:
        receive the event trigger condition, vehicle information, and suggested response from the vehicle operator engine;
        retrieve the external information relevant to the event trigger condition over the network from the one or more remote servers; and
        display the suggested response on a graphical user interface of the dispatcher engine,
        wherein the graphical user interfaces of the vehicle operator and dispatcher engines are synchronized and updated with the same set of information in real-time such that the graphical user interfaces of the vehicle operator and dispatcher engines are generated based on the same set of information including the vehicle information and external information, and such that the suggested response is simultaneously displayed to both crew and dispatcher, and
        wherein the suggested response is used to control a vehicle.

2. The system of claim 1, wherein the external information is environmental and/or traffic related information.

3. The system of claim 1, wherein information provided on the graphical user interface of the vehicle operator engine is consistent with the information provided on the graphical user interface of the dispatcher engine.

4. The system of claim 1, wherein the vehicle operator and dispatcher engines are periodically synchronized so that the vehicle operator and dispatcher engines work with a same version of one or more of a database, map, chart, or trajectory computation module.

5. The system of claim 1, wherein the vehicle system is onboard an aircraft and the trigger event condition is one or more of an aircraft engine out, power loss, maintenance fault, efficiency opportunity, or cabin depressurization event.

6. The system of claim 1, wherein the suggested response includes one or more alternate destinations.

7. The system of claim 6, wherein the vehicle system is onboard an aircraft, and the one or more alternate destinations are determined based on fuel remaining on the aircraft.

8. The system of claim 7, wherein the one or more alternate destinations are further determined based on one or more of cruise altitude, weather, geopolitical concerns, configuration policy, and traffic.

9. The system of claim 1, wherein the graphical user interfaces of the vehicle operator and dispatcher engines are configured to transmit and receive messages containing natural language text, images, files, or other information.

10. The system of claim 1, wherein the dispatcher engine is further configured to:
    determine that there is a violation of one or more standard operating procedures;
    determine that a trigger event condition will likely occur based on the violation;
    generate a suggested course of action based on the violation; and
    transmit a message indicating the violation and the suggested course of action to the vehicle operator engine.

11. The system of claim 10, wherein the suggested course of action is determined based on real-time data.

12. The system of claim 11, wherein the real-time data comprises one or more of traffic congestion, aircraft holds, or fuel level.

13. The system of claim 10, wherein the suggested course of action is further generated based on standard operating procedures.

14. A computer-implemented method for vehicle operator and dispatcher interfacing, the method comprising:
    detecting, by one or more processors, a trigger event condition;
    retrieving, by the one or more processors, vehicle information relevant to the event trigger condition from one or more local servers;
    receiving, by the one or more processors, external information relevant to the event trigger condition from one or more remote servers;
    generating, by the one or more processors, a suggested response based on the trigger event condition, retrieved vehicle information, and received external information;
    displaying, by the one or more processors, the suggested response on a graphical user interface of a vehicle operator engine; and
    transmitting, over a network by the one or more processors, one or more of the trigger event condition, retrieved vehicle information, or suggested response to a dispatcher engine, wherein the graphical user interfaces of the vehicle operator and dispatcher engines are synchronized and updated with the same set of information in real-time such that the graphical user interfaces of the vehicle operator and dispatcher engines are generated based on the same set of information including the vehicle information and external information, and such that the suggested response is simultaneously displayed to both crew and dispatcher, and wherein the suggested response is used to control a vehicle.

15. The computer-implemented method of claim 14, wherein the external information is environmental and/or traffic-related information.

16. The computer-implemented method of claim 14, wherein information provided on the graphical user interface of the vehicle operator engine is consistent with information provided on a graphical user interface of the dispatcher engine.

17. The computer-implemented method of claim 14, wherein the trigger event condition is one or more of a vehicle engine out, power loss, maintenance fault, efficiency opportunity, or cabin depressurization event.

18. The computer-implemented method of claim 14, wherein the suggested response includes one or more alternate destinations.

19. The computer-implemented method of claim 18, wherein the one or more alternate destinations are determined based on fuel remaining.

20. A non-transitory computer readable medium storing instructions which, when executed by at least one processor, cause the at least one processor to perform operations for vehicle operator and dispatcher interfacing, the operations comprising:

- detecting, by a vehicle operator engine, a trigger event condition;
- retrieving, by the vehicle operator engine, vehicle information relevant to the event trigger condition from one or more local servers;
- receiving, by the vehicle operator engine, external information relevant to the event trigger condition from one or more remote servers;
- generating, by the vehicle operator engine, a suggested response based on the trigger event condition, retrieved vehicle information, and received external information;
- displaying, by the vehicle operator engine, the suggested response on a graphical user interface of the vehicle operator engine; and
- transmitting, by the vehicle operator engine, one or more of the trigger event condition, retrieved vehicle information, or suggested response to a dispatcher engine,
- wherein the graphical user interfaces of the vehicle operator and dispatcher engines are synchronized and updated with the same set of information in real-time such that the graphical user interfaces of the vehicle operator and dispatcher engines are generated based on the same set of information including the vehicle information and external information, and such that the suggested response is simultaneously displayed to both crew and dispatcher, and
- wherein the suggested response is used to control a vehicle.

* * * * *